(12) United States Patent
Murakami et al.

(10) Patent No.: US 11,158,078 B2
(45) Date of Patent: Oct. 26, 2021

(54) IMAGE MEASUREMENT METHOD, IMAGE MEASUREMENT PROGRAM, IMAGE MEASUREMENT DEVICE, AND OBJECT MANUFACTURE METHOD

(71) Applicant: NIKON CORPORATION, Tokyo (JP)

(72) Inventors: Motoi Murakami, Yokohama (JP); Junichi Kubota, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 16/095,215

(22) PCT Filed: Apr. 22, 2016

(86) PCT No.: PCT/JP2016/062860
§ 371 (c)(1),
(2) Date: Oct. 19, 2018

(87) PCT Pub. No.: WO2017/183211
PCT Pub. Date: Oct. 26, 2017

(65) Prior Publication Data
US 2019/0139247 A1    May 9, 2019

(51) Int. Cl.
*G06T 7/60* (2017.01)
*G01B 11/02* (2006.01)
(Continued)

(52) U.S. Cl.
CPC ............. *G06T 7/60* (2013.01); *G01B 11/02* (2013.01); *G01B 11/022* (2013.01); *G01B 11/24* (2013.01); *G06T 7/0004* (2013.01); *G06T 7/50* (2017.01)

(58) Field of Classification Search
CPC ........... C02F 1/00; G01B 21/20; G01B 5/201; G01B 5/24; G01B 11/002; G01B 2210/56;
(Continued)

(56) References Cited

U.S. PATENT DOCUMENTS 5,657,251 A * 8/1997 Fiala .................. G01S 13/726
342/160
6,246,468 B1 * 6/2001 Dimsdale ............. G01B 11/002
356/4.02
(Continued)

FOREIGN PATENT DOCUMENTS

| EP | 2 557 538 A2 | 2/2013 |
| JP | H11-257923 | 9/1999 |
| JP | 2015-114875 A | 6/2015 |

OTHER PUBLICATIONS

Notice of Reasons for Rejection issued by Japanese Patent Office in corresponding Japanese Application No. 2018-512766, dated Oct. 15, 2019. (8 pages).
(Continued)

*Primary Examiner* — Santiago Garcia
(74) *Attorney, Agent, or Firm* — Finnegan, Henderson, Farabow, Garrett & Dunner, L.L.P.

(57) ABSTRACT

To contribute to improved usability, an image measurement method includes selectably displaying geometric shape-related information in a measurement target, selectably displaying a measurement candidate of the measurement target based on a geometric shape corresponding to the selected geometric shape-related information (S38), and outputting a calculation result of the selected measurement candidate.

33 Claims, 29 Drawing Sheets

(51) Int. Cl.
  *G06T 7/50* (2017.01)
  *G01B 11/24* (2006.01)
  *G06T 7/00* (2017.01)

(58) Field of Classification Search
  CPC .... G01B 11/2513; G01B 11/14; G01B 7/281;
    G01C 21/005; G01C 3/06; G01S 19/51;
    G01S 17/89; G01S 5/163; G01S 17/894;
    G01S 13/726; G01S 13/345; G01S
    2013/9322; G06T 2207/20021; G06T
    7/60; G06T 2207/20016; G06T 7/75;
    G06K 9/00201; G06K 9/00208; G01F
    25/0084; G08G 5/0082; F27B 7/26; F27B
    7/42; F27D 19/00; F27D 21/00; F27D
    21/04
  USPC ............... 382/103, 141; 342/159, 160, 162;
    702/151, 167
  See application file for complete search history.

(56) References Cited

U.S. PATENT DOCUMENTS

| | | | |
|---|---|---|---|
| 2003/0156749 A1* | 8/2003 | Nishiura | G06T 7/0004 382/149 |
| 2005/0010327 A1* | 1/2005 | Nakamura | G05B 19/4093 700/186 |
| 2007/0010965 A1* | 1/2007 | Malchi | G01C 3/06 702/151 |
| 2010/0189308 A1 | 7/2010 | Nakatsukasa | |
| 2012/0218437 A1* | 8/2012 | Hermary | G01B 11/245 348/222.1 |
| 2012/0245877 A1* | 9/2012 | Handa | G01R 33/022 702/95 |
| 2012/0246904 A1* | 10/2012 | Luepke | G01B 21/042 29/428 |
| 2012/0268567 A1* | 10/2012 | Nakazato | G01B 11/03 348/46 |
| 2012/0290258 A1* | 11/2012 | Hakkinen | F27D 21/04 702/151 |
| 2013/0057654 A1* | 3/2013 | Rafii | G06K 9/00201 348/46 |
| 2014/0005978 A1* | 1/2014 | Shimizu | G01B 21/20 702/167 |
| 2015/0007764 A1* | 1/2015 | Sudo | C30B 15/26 117/15 |
| 2015/0125035 A1* | 5/2015 | Miyatani | B25J 9/1697 382/103 |
| 2015/0268035 A1* | 9/2015 | Furihata | G01B 11/14 348/136 |
| 2016/0102972 A1* | 4/2016 | Kobayashi | G01B 11/002 356/610 |
| 2016/0252346 A1* | 9/2016 | Bismuth | A41H 1/02 356/610 |
| 2016/0258740 A1* | 9/2016 | Matsumoto | G01B 11/0691 |
| 2018/0147062 A1* | 5/2018 | Ay | G06T 19/20 |
| 2018/0374239 A1* | 12/2018 | Wallack | H04N 13/246 |

OTHER PUBLICATIONS

Written Opinion of the International Searching Authority dated Jul. 12, 2016 in counterpart International Application No. PCT/JP2016/062860, and the English translation thereof.
International Search Report issued in corresponding International Application No. PCT/JP2016/062860, dated Jul. 12, 2016.
Extended European search report issued in EP 16899483.8, dated Jan. 29, 2020.
Notice of Reasons for Rejection issued by Japanese Patent Office in corresponding Japanese Application No. 2020-080102, dated Jun. 29, 2021. (6 pages).
Nosaka, et al., "Improved Accuracy and Functionality of Three-Dimensional Visual Inspection Equipment," Panasonic Electric Mfg, vol. 58, No. 4, published Dec. 20, 2010. (19 pages).

* cited by examiner

<MEASUREMENT ITEM LIST>

| KIND OF GEOMETRIC SHAPE | MEASUREMENT ITEM |
|---|---|
| CIRCLE | CENTRAL COORDINATES<br>DIAMETER (RADIUS)<br>CIRCULARITY |
| STRAIGHT LINE | ANGLE (ANGLE FROM X AXIS)<br>STRAIGHTNESS<br>UNIT VECTOR<br>STARTING POINT COORDINATES<br>ENDING POINT COORDINATES |
| DOT | COORDINATES |
| CIRCULAR ARC | CENTRAL COORDINATES<br>DIAMETER (RADIUS)<br>CIRCULARITY |

<MEASUREMENT RESULT DB 32>

| ID | GEOMETRIC SHAPE OR MEASUREMENT CANDIDATE | ITEM 1 | VALUE 1 | ITEM 2 | VALUE 2 | ... | CHILD ID | PARENT ID |
|---|---|---|---|---|---|---|---|---|
| 1 | STRAIGHT LINE | STARTING POINT COORDINATES | x1,y1,z1 | ENDING POINT COORDINATES | x2,y2,z2 | ... | | |
| 2 | STRAIGHT LINE | STARTING POINT COORDINATES | x3,y3,z3 | ENDING POINT COORDINATES | x4,y4,z4 | ... | | |
| ⋮ | ⋮ | ⋮ | ⋮ | ⋮ | ⋮ | ⋮ | ⋮ | ⋮ |

FIG. 5B

<MEASUREMENT RESULT DB 32>

| ID | GEOMETRIC SHAPE OR MEASUREMENT CANDIDATE | ITEM 1 | VALUE 1 | ITEM 2 | VALUE 2 | ... | CHILD ID | PARENT ID |
|---|---|---|---|---|---|---|---|---|
| 1 | STRAIGHT LINE | STARTING POINT COORDINATES | x1,y1,z1 | ENDING POINT COORDINATES | x2,y2,z2 | ... | N | |
| 2 | STRAIGHT LINE | STARTING POINT COORDINATES | x3,y3,z3 | ENDING POINT COORDINATES | x4,y4,z4 | ... | N | |
| ⋮ | ⋮ | ⋮ | ⋮ | ⋮ | ⋮ | ⋮ | ⋮ | ⋮ |
| N | INTERSECTION OF TWO STRAIGHT LINES | COORDINATE VALUE | xN,yN,zN | ANGLE OF INTERSECTION | a | ... | | 1,2 |

<COMBINATION TABLE 34>

| COMBINATION OF SELECTED GEOMETRIC SHAPES | MEASUREMENT CANDIDATE | |
|---|---|---|
| | DISPLAY ITEM | CALCULATION ITEM |
| DOT × 2 | DISTANCE BETWEEN DOTS | · LENGTH<br>· COORDINATE DIFFERENCE OF EACH AXIS |
| | SPLIT DOT | · COORDINATE VALUE |
| DOT × 2 OR MORE | STRAIGHT LINE | · ANGLE (ANGLE FROM X AXIS)<br>· STRAIGHTNESS |
| | AVERAGE DOT | · COORDINATE VALUE |
| DOT × 3 OR MORE | CIRCLE | · CENTRAL COORDINATE VALUE<br>· DIAMETER (RADIUS)<br>· CIRCULARITY |
| | CIRCULAR ARC | · CENTRAL COORDINATE VALUE<br>· DIAMETER (RADIUS)<br>· CIRCULARITY |
| STRAIGHT LINE × 2 | MEDIAN LINE | · ANGLE (ANGLE FROM X AXIS) |
| | INTERSECTION OF TWO STRAIGHT LINES | · COORDINATE VALUE<br>· ANGLE OF INTERSECTION |
| | INSCRIBED CIRCLE | · CENTRAL COORDINATE VALUE<br>· DIAMETER (RADIUS)<br>· CIRCULARITY |
| STRAIGHT LINE × 3 | INSCRIBED CIRCLE | · CENTRAL COORDINATE VALUE<br>· DIAMETER (RADIUS)<br>· CIRCULARITY |
| CIRCLE × 2 | INTERSECTION OF CIRCLE AND CIRCLE | · COORDINATE VALUE |
| | TANGENT TO CIRCLE AND CIRCLE | · ANGLE (ANGLE FROM X AXIS) |
| DOT + STRAIGHT LINE | DISTANCE BETWEEN DOT AND STRAIGHT LINE | · LENGTH<br>· COORDINATE VALUE OF INTERSECTION POINT WITH PERPENDICULAR |
| DOT + CIRCULAR ARC | DISTANCE BETWEEN DOT AND CIRCULAR ARC | · LENGTH<br>· COORDINATE VALUE OF INTERSECTION POINT WITH PERPENDICULAR |
| CIRCLE + STRAIGHT LINE | INTERSECTION OF CIRCLE AND STRAIGHT LINE | · COORDINATE VALUE |

FIG. 6

«COMBINATION TABLE 134»

| COMBINATION OF SELECTED GEOMETRIC SHAPES | MEASUREMENT CANDIDATE DISPLAY ITEM | MEASUREMENT CANDIDATE CALCULATION ITEM | GEOMETRIC SHAPE SELECTABLE NEXT |
|---|---|---|---|
| DOT × 2 | DISTANCE BETWEEN DOTS | • LENGTH<br>• COORDINATE DIFFERENCE OF EACH AXIS | DOT, STRAIGHT LINE |
| | SPLIT DOT | • COORDINATE VALUE | DOT, STRAIGHT LINE |
| DOT × 2 OR MORE | STRAIGHT LINE | • ANGLE (ANGLE FROM X AXIS)<br>• STRAIGHTNESS | THREE DOTS SELECTED: DOT, STRAIGHT LINE<br>FOUR DOTS OR MORE SELECTED: DOT |
| | AVERAGE DOT | • COORDINATE VALUE | THREE DOTS SELECTED: DOT, STRAIGHT LINE<br>FOUR DOTS OR MORE SELECTED: DOT |
| DOT × 3 OR MORE | CIRCLE | • CENTRAL COORDINATE VALUE<br>• DIAMETER (RADIUS)<br>• CIRCULARITY | THREE DOTS SELECTED: DOT, STRAIGHT LINE<br>FOUR DOTS OR MORE SELECTED: DOT |
| | CIRCULAR ARC | • CENTRAL COORDINATE VALUE<br>• DIAMETER (RADIUS)<br>• CIRCULARITY | THREE DOTS SELECTED: DOT, STRAIGHT LINE<br>FOUR DOTS OR MORE SELECTED: DOT |
| STRAIGHT LINE × 2 | MEDIAN LINE | • ANGLE (ANGLE FROM X AXIS) | STRAIGHT LINE |
| | INTERSECTION OF TWO STRAIGHT LINES | • COORDINATE VALUE<br>• ANGLE OF INTERSECTION | STRAIGHT LINE |
| | INSCRIBED CIRCLE | • CENTRAL COORDINATE VALUE<br>• DIAMETER (RADIUS)<br>• CIRCULARITY | STRAIGHT LINE |
| STRAIGHT LINE × 3 | INSCRIBED CIRCLE | • CENTRAL COORDINATE VALUE<br>• DIAMETER (RADIUS)<br>• CIRCULARITY | NONE |
| CIRCLE × 2 | INTERSECTION OF CIRCLE AND CIRCLE | • COORDINATE VALUE | DOT |
| | TANGENT TO CIRCLE AND CIRCLE | • ANGLE (ANGLE FROM X AXIS) | DOT |
| DOT + STRAIGHT LINE | DISTANCE BETWEEN DOT AND STRAIGHT LINE | • LENGTH<br>• COORDINATE VALUE OF INTERSECTION POINT WITH PERPENDICULAR | DOT |
| DOT + CIRCULAR ARC | DISTANCE BETWEEN DOT AND CIRCULAR ARC | • LENGTH<br>• COORDINATE VALUE OF INTERSECTION POINT WITH PERPENDICULAR | DOT |
| CIRCLE + STRAIGHT LINE | INTERSECTION OF CIRCLE AND STRAIGHT LINE | • COORDINATE VALUE | DOT |

FIG. 15

<COMBINATION TABLE 204>

| COMBINATION OF SELECTED GEOMETRIC SHAPES | MEASUREMENT CANDIDATE DISPLAY ITEM | MEASUREMENT CANDIDATE CALCULATION ITEM | INAPPROPRIATE CONDITION FOR CANDIDATE |
|---|---|---|---|
| DOT × 2 | DISTANCE BETWEEN DOTS | • LENGTH<br>• COORDINATE DIFFERENCE OF EACH AXIS | NONE |
| | SPLIT DOT | • COORDINATE VALUE | NONE |
| DOT × 2 OR MORE | STRAIGHT LINE | • ANGLE (ANGLE FROM X AXIS)<br>• STRAIGHTNESS | DETERMINATION CONDITION OF STRAIGHT LINE |
| | AVERAGE DOT | • COORDINATE VALUE | NONE |
| DOT × 3 OR MORE | CIRCLE | • CENTRAL COORDINATE VALUE<br>• DIAMETER (RADIUS)<br>• CIRCULARITY | DETERMINATION CONDITION OF CIRCLE |
| | CIRCULAR ARC | • CENTRAL COORDINATE VALUE<br>• DIAMETER (RADIUS)<br>• CIRCULARITY | DETERMINATION CONDITION OF CIRCLE |
| STRAIGHT LINE × 2 | MEDIAN LINE | • ANGLE (ANGLE FROM X AXIS) | NONE |
| | INTERSECTION OF TWO STRAIGHT LINES | • COORDINATE VALUE<br>• ANGLE OF INTERSECTION | DETERMINATION CONDITION OF INTERSECTION |
| | INSCRIBED CIRCLE | • CENTRAL COORDINATE VALUE<br>• DIAMETER (RADIUS)<br>• CIRCULARITY | NONE |
| STRAIGHT LINE × 3 | INSCRIBED CIRCLE | • CENTRAL COORDINATE VALUE<br>• DIAMETER (RADIUS)<br>• CIRCULARITY | NONE |
| CIRCLE × 2 | INTERSECTION OF CIRCLE AND CIRCLE | • COORDINATE VALUE | DETERMINATION CONDITION OF INTERSECTION OF CIRCLE AND CIRCLE |
| | TANGENT TO CIRCLE AND CIRCLE | • ANGLE (ANGLE FROM X AXIS) | DETERMINATION CONDITION OF TANGENT TO CIRCLE AND CIRCLE |
| DOT + STRAIGHT LINE | DISTANCE BETWEEN DOT AND STRAIGHT LINE | • LENGTH<br>• COORDINATE VALUE OF INTERSECTION POINT WITH PERPENDICULAR | NONE |
| DOT + CIRCULAR ARC | DISTANCE BETWEEN DOT AND CIRCULAR ARC | • LENGTH<br>• COORDINATE VALUE OF INTERSECTION POINT WITH PERPENDICULAR | NONE |
| CIRCLE + STRAIGHT LINE | INTERSECTION OF CIRCLE AND STRAIGHT LINE | • COORDINATE VALUE | DETERMINATION CONDITION OF INTERSECTION OF CIRCLE AND STRAIGHT LINE |

FIG. 18

| KIND OF DETERMINATION CONDITION | CALCULATION METHOD | DETERMINATION CONDITION |
|---|---|---|
| DETERMINATION CONDITION OF STRAIGHT LINE | CALCULATE APPROXIMATE STRAIGHT LINE FROM DATA ABOUT PLURALITY OF DOTS BY LEAST SQUARE METHOD | EVALUATE VARIANCE OF DATA ABOUT EACH DOT FROM APPROXIMATE STRAIGHT LINE AND DETERMINE THAT IT IS INAPPROPRIATE UNDER A CONDITION THAT VARIANCE IS GREATER THAN OR EQUAL TO THRESHOLD |
| DETERMINATION CONDITION OF CIRCLE | CALCULATE APPROXIMATE CIRCLE FROM DATA ABOUT PLURALITY OF DOTS BY LEAST SQUARE METHOD | EVALUATE VARIANCE OF DATA ABOUT EACH DOT FROM APPROXIMATE CIRCLE AND DETERMINE THAT IT IS INAPPROPRIATE UNDER A CONDITION THAT VARIANCE IS GREATER THAN OR EQUAL TO THRESHOLD |
| DETERMINATION CONDITION OF INTERSECTION OF STRAIGHT LINE AND STRAIGHT LINE | CALCULATE COORDINATES OF INTERSECTION POINT FROM DATA ABOUT TWO STRAIGHT LINES | INAPPROPRIATE WITHOUT COORDINATES OF INTERSECTION POINT OR INAPPROPRIATE UNDER A CONDITION THAT COORDINATES OF INTERSECTION POINT HAVE INAPPROPRIATE VALUE |
| DETERMINATION CONDITION OF INTERSECTION OF CIRCLE AND CIRCLE | CHECK WHETHER CIRCLES INTERSECT BASED ON DATA ABOUT TWO CIRCLES | INAPPROPRIATE WITHOUT INTERSECTION POINT |
| DETERMINATION CONDITION OF TANGENT TO CIRCLE AND CIRCLE | CHECK WHETHER THERE IS TANGENT BASED ON DATA ABOUT TWO CIRCLES | INAPPROPRIATE WITHOUT TANGENT |
| DETERMINATION CONDITION OF INTERSECTION OF CIRCLE AND STRAIGHT LINE | CHECK WHETHER THERE IS INTERSECTION POINT BASED ON DATA ABOUT CIRCLE AND STRAIGHT LINE | INAPPROPRIATE WITHOUT INTERSECTION POINT |

FIG. 19

<WITHOUT INTERSECTION POINT (PART ONE)>

FOR L > (r1 + r2)

<WITHOUT INTERSECTION POINT (PART TWO)>

FOR L < |r1 − r2|

<WITHOUT TANGENT>

FOR L < |r1 − r2|

<WITHOUT INTERSECTION POINT>

FOR L > r

<SELECTION HISTORY DB>

| COMBINATION OF SELECTED GEOMETRIC SHAPES | MEASUREMENT CANDIDATE | ... | NUMBER OF SELECTED TIMES |
|---|---|---|---|
| DOT × 2 | DISTANCE BETWEEN DOTS | ... | 10 |
| | SPLIT DOT | ... | 2 |
| DOT × 2 OR MORE | STRAIGHT LINE | ... | 12 |
| | AVERAGE DOT | ... | 0 |
| ⋮ | ⋮ | ⋮ | ⋮ |
| STRAIGHT LINE × 2 | MEDIAN LINE | ... | 3 |
| | INTERSECTION OF TWO STRAIGHT LINES | ... | 25 |
| | INSCRIBED CIRCLE | ... | 0 |
| ⋮ | ⋮ | ⋮ | ⋮ |

FIG. 22

<COMBINATION TABLE 334>

| COMBINATION OF SELECTED GEOMETRIC SHAPES | MEASUREMENT CANDIDATE | | SUBSTITUTABLE SHAPE |
|---|---|---|---|
| | DISPLAY ITEM | CALCULATION ITEM | |
| DOT × 2 | DISTANCE BETWEEN DOTS | • LENGTH<br>• COORDINATE DIFFERENCE OF EACH AXIS | NONE |
| | SPLIT DOT | • COORDINATE VALUE | SUBSTITUTABLE AS DOT |
| DOT × 2 OR MORE | STRAIGHT LINE | • ANGLE (ANGLE FROM X AXIS)<br>• STRAIGHTNESS | NONE |
| | AVERAGE DOT | • COORDINATE VALUE | SUBSTITUTABLE AS DOT |
| DOT × 3 OR MORE | CIRCLE | • CENTRAL COORDINATE VALUE<br>• DIAMETER (RADIUS)<br>• CIRCULARITY | SUBSTITUTABLE AS DOT |
| | CIRCULAR ARC | • CENTRAL COORDINATE VALUE<br>• DIAMETER (RADIUS)<br>• CIRCULARITY | SUBSTITUTABLE AS DOT |
| STRAIGHT LINE × 2 | MEDIAN LINE | • ANGLE (ANGLE FROM X AXIS) | SUBSTITUTABLE AS STRAIGHT LINE |
| | INTERSECTION OF TWO STRAIGHT LINES | • COORDINATE VALUE<br>• ANGLE OF INTERSECTION | SUBSTITUTABLE AS DOT |
| | INSCRIBED CIRCLE | • CENTRAL COORDINATE VALUE<br>• DIAMETER (RADIUS)<br>• CIRCULARITY | SUBSTITUTABLE AS DOT |
| STRAIGHT LINE × 3 | INSCRIBED CIRCLE | • CENTRAL COORDINATE VALUE<br>• DIAMETER (RADIUS)<br>• CIRCULARITY | SUBSTITUTABLE AS DOT |
| CIRCLE × 2 | INTERSECTION OF CIRCLE AND CIRCLE | • COORDINATE VALUE | SUBSTITUTABLE AS DOT |
| | TANGENT TO CIRCLE AND CIRCLE | • ANGLE (ANGLE FROM X AXIS) | SUBSTITUTABLE AS STRAIGHT LINE |
| DOT + STRAIGHT LINE | DISTANCE BETWEEN DOT AND STRAIGHT LINE | • LENGTH<br>• COORDINATE VALUE OF INTERSECTION POINT WITH PERPENDICULAR | SUBSTITUTABLE AS DOT |
| DOT + CIRCULAR ARC | DISTANCE BETWEEN DOT AND CIRCULAR ARC | • LENGTH<br>• COORDINATE VALUE OF INTERSECTION POINT WITH PERPENDICULAR | SUBSTITUTABLE AS DOT |
| CIRCLE + STRAIGHT LINE | INTERSECTION OF CIRCLE AND STRAIGHT LINE | • COORDINATE VALUE | SUBSTITUTABLE AS DOT |

FIG. 26

<MEASUREMENT RESULT DB 32>

| ID | GEOMETRIC SHAPE OR MEASUREMENT CANDIDATE | ... | CHILD ID | PARENT ID |
|---|---|---|---|---|
| 1 | STRAIGHT LINE | ... | 6 | |
| 2 | STRAIGHT LINE | ... | 6 | |
| 3 | STRAIGHT LINE | ... | | |
| 4 | CIRCLE | ... | 7 | |
| 5 | CIRCLE | ... | | |
| 6 | MEDIAN LINE | ... | 7 | 1, 2 |
| 7 | DISTANCE (BETWEEN DOT AND STRAIGHT LINE) | ... | | 4, 6 |

FIG. 27

IMAGE MEASUREMENT METHOD, IMAGE MEASUREMENT PROGRAM, IMAGE MEASUREMENT DEVICE, AND OBJECT MANUFACTURE METHOD

CROSS-REFERENCE

This application is a U.S. national phase entry of International Application No. PCT/JP2016/062860 which was filed on Apr. 22, 2016, and the disclosure of International Application No. PCT/JP2016/062860 is incorporated herein by reference in their entirety.

TECHNICAL FIELD

The present disclosure relates to an image measurement method, an image measurement program stored in a non-transitory computer readable medium, an image measurement device, and a method for manufacturing an object.

BACKGROUND ART

An image measurement device used in the industrial field and the like displays an image of a measurement target acquired by image capturing on a display screen, also executes a geometric shape included in the image of the measurement target, and then performs measurement processing related to the extracted geometric shape (for example, see US Patent Application No. 2014/0005978).

The operation for a measurement has required a lot of time and effort, and usability for a user has been poor.

The present disclosure has been made in view of the aforementioned problems, and an object thereof is to provide an image measurement method, an image measurement program, and an image measurement device being capable of improving usability, and a method for manufacturing an object being capable of simplifying operation.

An image measurement method of the present disclosure is an image measurement method that includes selectably displaying geometric shape-related information in a measurement target, selectably displaying a measurement candidate of the measurement target based on a geometric shape corresponding to the selected geometric shape-related information, and outputting a calculation result of the selected measurement candidate.

A method for manufacturing an object of the present disclosure is a method for manufacturing an object that includes the steps of manufacturing an object, calculating the measurement candidate of the object manufactured in the manufacturing step serving as a measurement target by using the image measurement method of the present invention, and determining quality of the object based on a calculation result in the calculating step.

An image measurement program stored in a non-transitory computer-readable recording medium of the present disclosure is an image measurement program that causes a computer to execute selectably displaying, in response to receiving a selection of geometric shape-related information in a measurement target, a measurement candidate of the measurement target based on a geometric shape corresponding to the geometric shape-related information, and outputting, in response to receiving a selection of the displayed measurement candidate, a calculation result of the selected measurement candidate.

An image measurement device of the present disclosure includes display control unit configured to cause a display device to selectably display, in response to receiving a selection of geometric shape-related information in a measurement target, a measurement candidate of the measurement target based on a geometric shape corresponding to the geometric shape-related information, and an output unit configured to output, in response to receiving a selection of the displayed measurement candidate, a calculation result of the selected measurement candidate.

An image measurement method, an image measurement program stored in a non-transitory computer-readable recording medium, and an image measurement device of the present disclosure may achieve the effect capable of improving usability. Further, a method for manufacturing an object of the present disclosure may achieve the effect capable of simplifying operation.

BRIEF DESCRIPTION OF DRAWINGS

FIG. 2 is a diagram illustrating a measurement item list.

FIGS. 5A and 5B are diagrams each illustrating one example of a data structure of a measurement result DB in FIG. 4.

FIG. 6 is a diagram illustrating one example of a data structure of a combination table in FIG. 4.

FIG. 15 is a diagram illustrating one example of a data structure of a combination table used in the second embodiment.

FIG. 18 is a diagram illustrating one example of a data structure of a combination table used in the third embodiment.

FIG. 19 is a table showing determination conditions used in the third embodiment.

FIG. 22 is a diagram illustrating one example of a data structure of a selection history table used in the fourth embodiment.

FIG. 26 is a diagram illustrating one example of a data structure of a combination table used in the sixth embodiment.

FIG. 27 is a diagram illustrating a data example of a measurement result DB corresponding to FIG. 25.

DESCRIPTION OF EMBODIMENTS

First Embodiment

Figure 1:
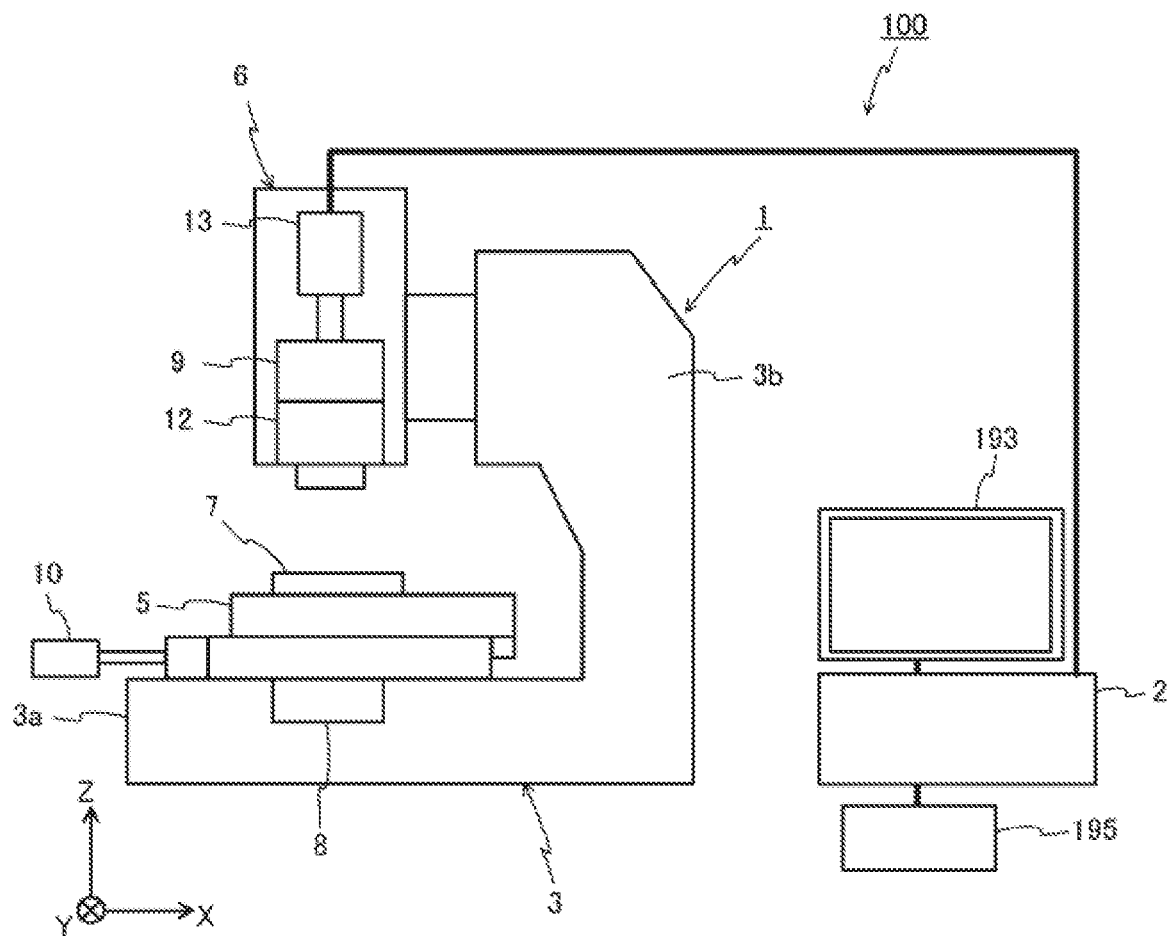
FIG. 1 is a diagram illustrating a configuration of an image measurement device according to a first embodiment.

Hereinafter, an image measurement device according to a first embodiment will be described in detail based on FIGS. 1 to 13. FIG. 1 schematically illustrates a configuration of an image measurement device 100 according to the first embodiment.

As illustrated in FIG. 1, the image measurement device 100 includes a measurement device main body 1, a control unit 2, a display device 193, and an input device 195.

The measurement device main body 1 includes a support body 3, an XY stage 5 provided on a base section 3a of the support body 3, and an image capturing unit 6 supported by a supporting post section 3b of the support body 3 so as to be located over the XY stage 5.

The XY stage 5 is a stage that moves in two axial directions (X-axis and Y-axis directions) orthogonal to each other in a horizontal plane. An object 7 (hereinafter referred to as a measurement target 7) such as a component of an automobile and a mechanical component is placed on a top surface of the XY stage 5. The measurement target 7 is illuminated by a transmitted illumination optical system 8 provided in the base section 3a of the support body 3 or a vertical illumination optical system 9 provided in the image capturing unit 6.

The XY stage 5 is provided with an XY stage driving unit 10 that moves the XY stage 5 in a two-dimensional direction based on a stage movement instruction from the control unit 2 and a stage position detection unit (not illustrated) that detects coordinates of the XY stage 5 and outputs a signal indicating a stage coordinate value to the control unit 2. The XY stage driving unit 10 includes an X-axis motor and a Y-axis motor that respectively drive the XY stage 5 in the X-axis direction and the Y-axis direction. The stage position detection unit includes an X-axis encoder and a Y-axis encoder that respectively detect a position of the XY stage 5 in the X-axis direction and the Y-axis direction.

The image capturing unit 6 includes an image-forming optical system 12 that forms an image with light from the measurement target 7 and a charge coupled device (CCD) camera 13 that captures (receives) an image of the measurement target 7 having the image formed by the image-forming optical system 12 and outputs an electrical signal according to a light intensity distribution of the captured image, in addition to the vertical illumination optical system 9. The image-forming optical system 12 in the present embodiment is a variable power optical system. Note that, the image-forming optical system may not be a variable power optical system and may be an optical system with a fixed magnification.

Note that, an auto focus mechanism, which is not illustrated, is provided in the vicinity of the image capturing unit 6. The auto focus mechanism is used for automatically obtaining a focal point on the measurement target 7 in image measurement. Examples of this auto focus method include a method called a passive method for changing a relative distance between the image-forming optical system 12 and the measurement target 7 in a Z-axis direction to acquire a plurality of images and calculating a position in which image contrast is maximized as a focus position, and a method called an active method for illuminating the measurement target 7 with light of a laser diode or a light emitting diode (LED) as auxiliary light and obtaining a focus position from displacement of a light spot position of reflected light of the measurement target 7. Note that, the auto focus mechanism can measure a height (measure a Z position) of the measurement target 7 based on information acquired from auto focus.

The control unit 2 controls operations of the measurement device main body 1, acquires an image by capturing an image of the measurement target 7, and causes the display device 193 to display the acquired image. Further, the control unit 2 measures a geometric shape included in the image of the measurement target 7 displayed on the display device 193, selectably displays information related to the measured geometric shape (hereinafter referred to as geometric shape-related information such as an icon indicating a geometric shape as described later), selectably displays a measurement candidate of the measurement target 7 based on a geometric shape corresponding to the selected geometric shape-related information, and calculates the selected measurement candidate (that is, an arbitrary measurement item of the measurement target 7) by using a measurement result of the geometric shape. Herein, the geometric shape represents a geometric basic shape and includes, for example, a circle, a straight line, a dot, and/or a circular arc. Further, measuring a geometric shape represents identifying a contour of a shape (that is, a geometric shape) closely resembling a geometric shape from the image of the measurement target 7 and performing a measurement related to the geometric shape. FIG. 2 is a measurement item list exemplifying specific measurement items under a condition that a geometric shape is measured. As illustrated in FIG. 2, for example, under a condition that a straight line is measured as a geometric shape, a contour (in other words, a straight line) closely resembling a straight line in the image of the measurement target 7 is identified, and an angle (angle from the X axis), straightness, a unit vector, starting point coordinates, and/or ending point coordinates of the identified contour are obtained. The measurement item represents a candidate for a measurement item that holds true based on a geometric shape (in other words, a candidate for a measurement item that can be calculated by using a measurement result of a geometric shape). For example, under a condition that a measurement result of two dots as geometric shapes is used, the measurement item includes a distance between the dots and/or coordinates of a split dot. For example, under a condition that a measurement result of two straight lines as geometric shapes is used, the measurement item includes coordinates of an intersection point of the two straight lines and/or a diameter of an inscribed circle of the two straight lines. Note that, the measurement candidate also represents a measurement item based on one geometric shape (in other words, a measurement item that can be calculated for one geometric shape). For example, under a condition that the geometric shape is a circle, the measurement candidate includes central coordinates, a diameter, and/or circularity (see MEASUREMENT ITEM in FIG. 2).

Figure 3:
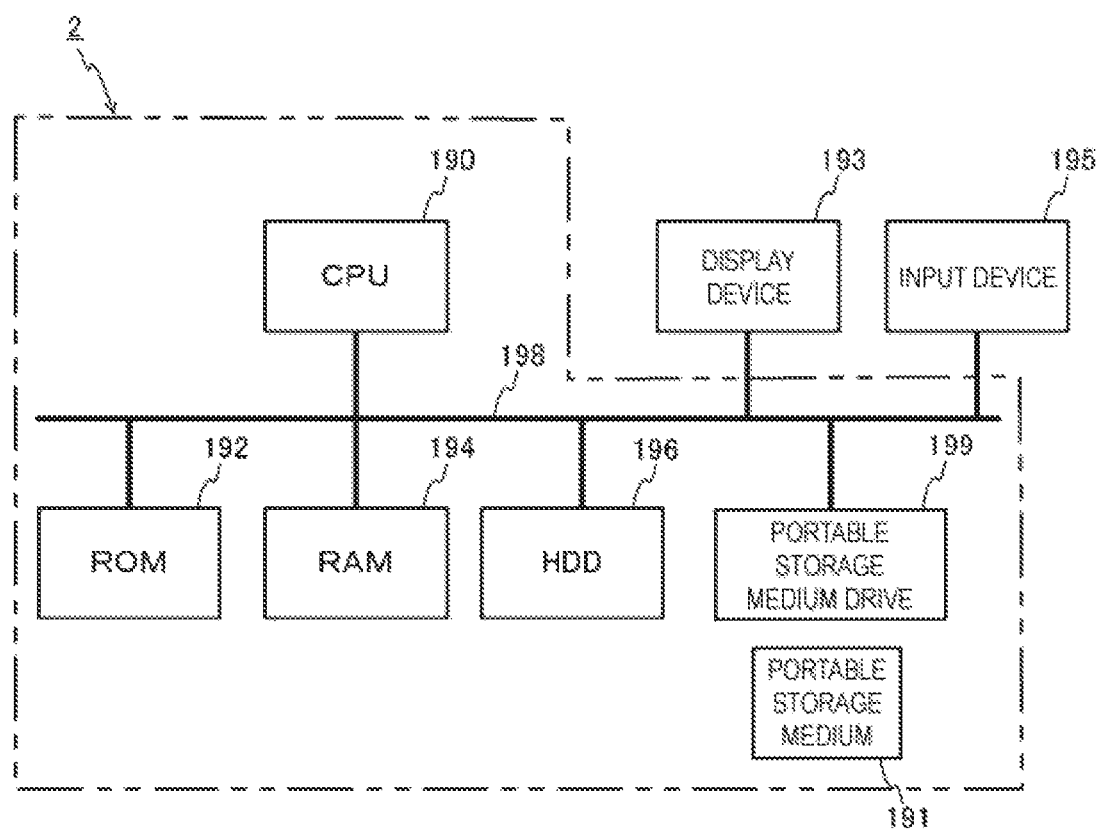
FIG. 3 is a block diagram of a control unit in FIG. 1.

FIG. 3 illustrates a block diagram (hardware configuration) of the control unit 2. As illustrated in FIG. 3, the control unit 2 includes a central processing unit (CPU) 190, a read only memory (ROM) 192, a random access memory (RAM) 194, a storage unit (hard disk drive (HDD) herein) 196, and a portable storage medium drive 199. These structural components of the control unit 2 are connected to a bus 198.

The display device 193 includes a liquid crystal display and the like. The input device 195 includes a controller, a keyboard, a mouse, and the like. Note that, the input device 195 may be a touch panel display provided integrally with the display device 193. The display device 193 and the input device 195 are connected to the bus 198 in FIG. 3 through an input-output interface, which is not illustrated.

Figure 4:
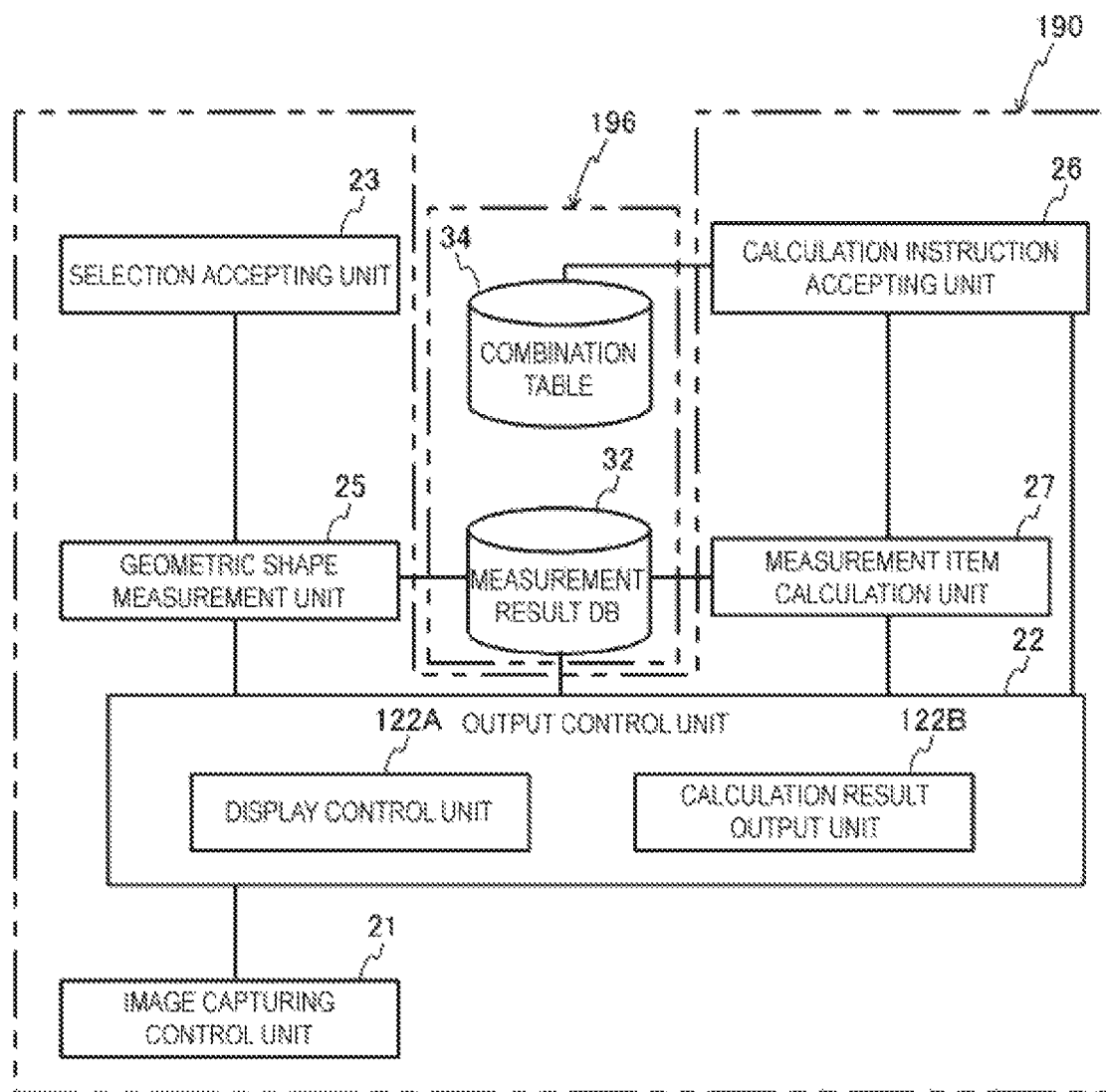
FIG. 4 is a detailed block diagram of a CPU in FIG. 3.

FIG. 4 illustrates a detailed block diagram of the CPU 190. Note that, FIG. 4 also illustrates a combination table 34 and a measurement result DB 32 stored in the HDD 196 for the sake of drawing and description. As illustrated in FIG. 4, the control unit 2 includes an image capturing control unit 21, an output control unit 22, a selection receiving unit 23, a geometric shape measurement unit 25, a calculation instruction receiving unit 26, and a measurement item calculation unit 27 as a calculation unit. Note that, functionality of each of the units in FIG. 4 is achieved by the CPU 190 executing a program (including an image measurement program) stored in the ROM 192 or the HDD 196 or a program (including an image measurement program) read from a portable storage medium 191 by the portable storage medium drive 199.

The image capturing control unit 21 controls operations of the measurement device main body 1 in response to an instruction from a user through the input device 195 or based on a previously set measurement condition, and causes the image capturing unit 6 to capture an image of the measurement target 7. Further, the image capturing control unit 21 acquires the image captured by the image capturing unit 6 and transmits the image to the output control unit 22.

Figure 9:
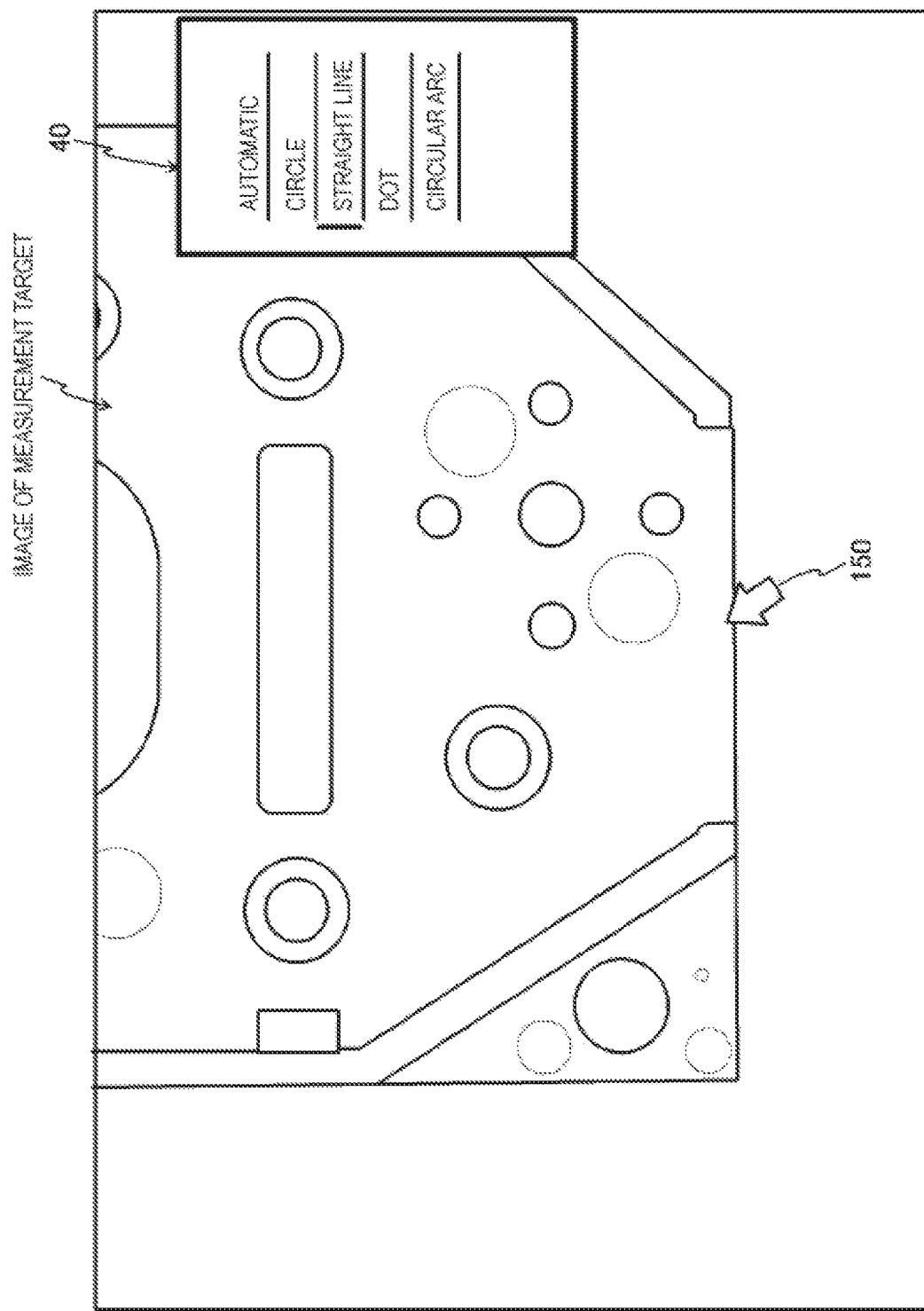
FIG. 9 is a diagram (part one) illustrating a display example of a display device.

The output control unit 22 includes a display control unit 122A and a calculation result output unit 122B. The display control unit 122A causes the display device 193 to display a screen (see FIG. 9 and the like) including the image of the measurement target 7 received from the image capturing control unit 21. In this case, as illustrated in FIG. 9, the display control unit 122A causes the display device 193 to display a menu 40 for a user to select a kind (such as a circle, a straight line, a dot, and/or a circular arc) of a geometric shape to be measured in addition to the image of the measurement target 7. Further, the display control unit 122A appropriately causes the display device 193 to display other necessary information. The calculation result output unit 122B outputs a calculation result by the measurement item calculation unit 27 for display on the display device 193.

The selection receiving unit 23 acquires information about a geometric shape selected on the menu 40 through the input device 195 by a user and position information about a location selected on the image of the measurement target 7 through the input device 195 by the user.

The geometric shape measurement unit 25 identifies, based on the information acquired by the selection receiving unit 23, a geometric shape in the image of the measurement target 7 (that is, a contour of the measurement target 7 in the image) based on a contrast of the image, and performs a measurement related to the identified geometric shape by an existing measurement method. Specifically, the geometric shape measurement unit 25 performs the following measurement processing. Note that, a geometric shape in an image may not be measured by the following measurement processing method, and may be measured by another existing method.

(1) The geometric shape measurement unit 25 calculates an average value of luminance values around a location (for example, a point) selected on the image displayed on the display device 193 through the input device 195 by the user, and binarizes the image by using the calculated average value. As one example, an average value of luminance values of 10×10 pixels around a location selected on the image through the input device 195 is calculated, and the image is binarized with 50% of the calculated average value as a threshold value.

(2) Next, the geometric shape measurement unit 25 calculates contrasts based on luminance values (signal intensities) of pixels in the image of the measurement target 7 along a plurality of directions from the location selected by the user as a starting point being the center, determines a direction in which a contrast among the contrasts calculated for the plurality of directions is the highest as a scan direction (this scan direction is a direction almost orthogonal to the contour (geometric shape) of the measurement target 7), and detects coordinates of a location having the highest contrast in the direction to identify a part of the geometric shape (that is, a point on the contour of the measurement target 7 in the image).

(3) Next, the geometric shape measurement unit 25 calculates a contrast in the scan direction of (2) again in a position away at a predetermined pitch in a direction different from the determined scan direction (for example, a direction orthogonal to the scan direction), and detects coordinates of a location having the highest contrast to identify a part of the geometric shape (a point on the contour).

(4) The geometric shape measurement unit 25 repeats (3) until a part of the geometric shape (a point on the contour) is not found, and acquires a point sequence on the contour of the measurement target 7. Note that, under a condition that (3) is repeated, the scan direction may be corrected according to the identified geometric shape. Specifically, the entire geometric shape may be predicted based on a shape of a part of the identified geometric shape, and the scan direction may be corrected so as to be orthogonal to the predicted geometric shape.

(5) Next, the geometric shape measurement unit 25 identifies a geometric shape from the acquired point sequence on the contour based on a kind of the geometric shape selected by the user. The geometric shape measurement unit 25 also performs a measurement related to the geometric shape by using coordinates of the point sequence (point sequence data) on the contour according to the identified result. Specifically, in the processing of (5), the geometric shape measurement unit 25 obtains a shape closely resembling the geometric shape (straight line and/or circle) selected on the menu 40 by the user from the point sequence on the contour, and obtains an error between the obtained approximate shape and each point included in the point sequence on the contour and also obtains a variance. Then, under a condition that the variance is smaller than a predetermined threshold value, the geometric shape measurement unit 25 determines a kind of the approximate shape (that is, a kind of the geometric shape) having the variance smaller than the predetermined threshold value, and identifies the geometric shape in the measurement target 7 in the image. Furthermore, the measurement related to the identified geometric shape is performed based on coordinates of the point sequence (point sequence data) of the points on the contour. On the other hand, under a condition that the variance is greater than the predetermined threshold value, it is determined as an error.

Herein, for example, under a condition that the user selects a straight line as a kind of a geometric shape to be measured in the menu 40, and a point sequence of linear contour points on the image of the measurement target 7 (that is, a straight line on the image of the measurement target 7) is identified, a unit vector, an angle from the X axis, and straightness are obtained in the aforementioned processing of (5) (see FIG. 2). Note that, since these physical quantities can be obtained by an existing computation method, description thereof will be omitted. As described above, the coordinates of each of the identified linear contour points are obtained, and thus it is assumed that starting point coordinates and ending point coordinates are coordinates of the contour points on both sides.

Note that, under a condition that the user selects a dot as a kind of a geometric shape to be measured in the menu 40, the geometric shape measurement unit 25 omits the processing of (3) to (5) in the above-described measurement processing, detects coordinates by the processing of (2), and identifies a geometric shape as a dot.

Note that, the user may not select a kind of a geometric shape to be measured in the menu 40. For example, under a condition that the user selects "automatic" in the menu 40, the geometric shape measurement unit 25 performs the above-described processing of (1) to (4), obtains an approximate shape by a least square method from the point sequence on the contour acquired in (4), and obtains a variance from an error between the obtained approximate shape and each point in the point sequence on the contour. A kind of the approximate shape (that is, a kind of the geometric shape) having the variance smaller than a predetermined threshold value may be determined, and the geometric shape in the measurement target 7 in the image may be identified. Furthermore, the measurement related to the identified geometric shape may be performed based on coordinates of the point sequence on the contour (point sequence data).

Figure 10:
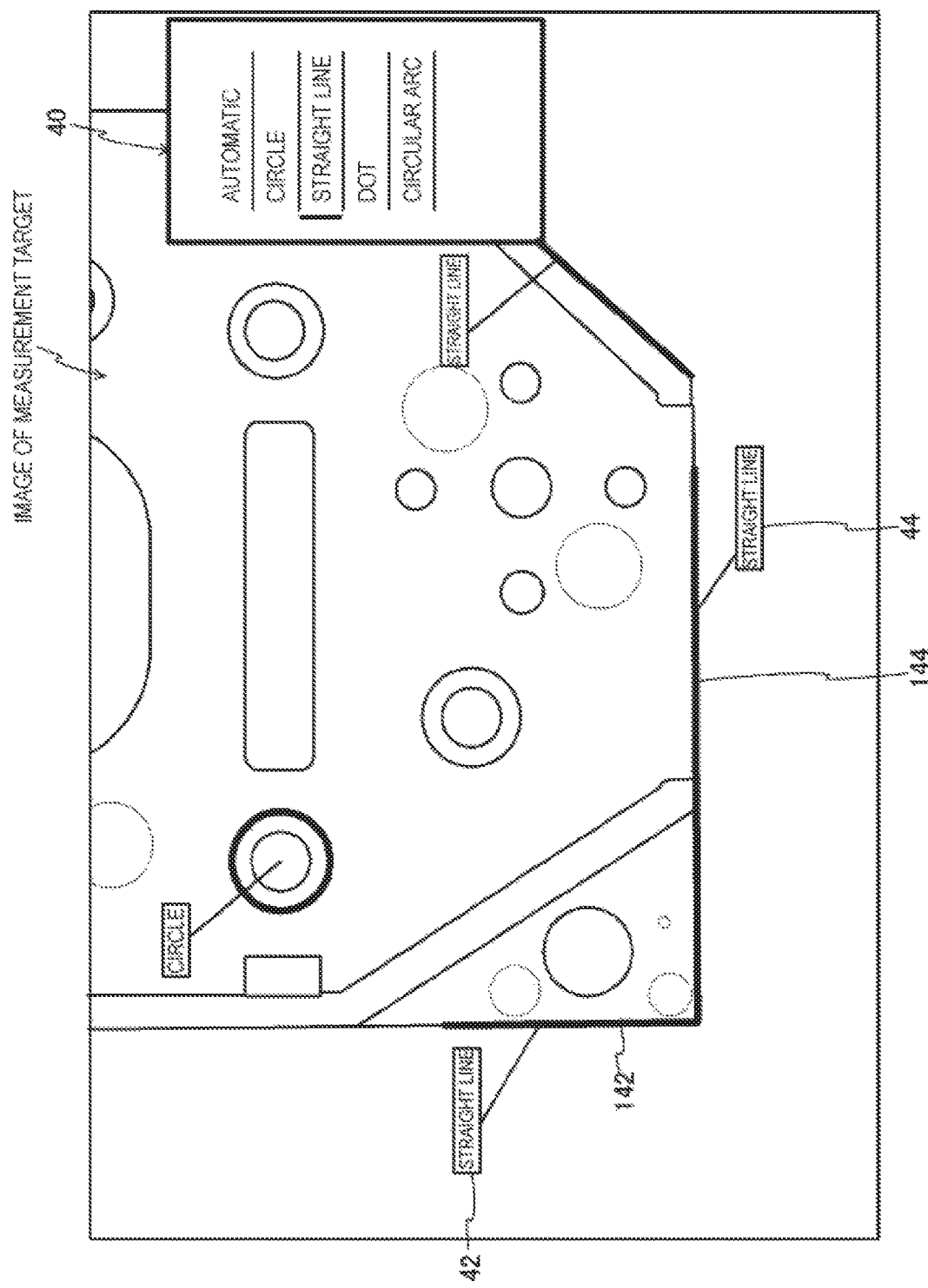
FIG. 10 is a diagram (part two) illustrating a display example of the display device.

The geometric shape measurement unit 25 stores a measurement result acquired from the above-described measurement in the measurement result DB 32. Under a condition that the measurement result of the geometric shape is stored in the measurement result DB 32, the display control unit 122A emphasizes and displays the measured geometric shape (contour) on the image of the measurement target 7 as illustrated in FIG. 10 (see signs 142 and 144). The display control unit 122A also displays, as geometric shape-related information selectable by the user, an icon indicating the measured geometric shape such that the icon is selectable by the user through the input device 195 (see signs 42 and 44).

Herein, the measurement result DB 32 is a database for storing a measurement result of a geometric shape and a calculation result of a measurement candidate (that is, a measurement item), and includes a data structure as illustrated in FIGS. 5A and 5B. Specifically, the measurement result DB 32 includes fields such as an ID, a geometric shape or a measurement candidate, items 1, 2, and . . . , values 1, 2, and . . . , a child ID, and a parent ID. Identification information provided to the measurement result of the geometric shape or the calculation result of the measurement candidate is stored in the field of the ID. A kind (such as a circle, a straight line, a dot, and/or a circle) of the measured geometric shape or a kind (such as an intersection of two straight lines and/or a distance between dots) of the measurement candidate is stored in the field of the geometric shape or the measurement candidate. Contents (such as starting point coordinates, ending point coordinates, a length, central coordinates, and/or a diameter) measured for the geometric shape or contents (such as a length, a coordinate value, and/or an angle) calculated for the measurement candidate are stored in the fields of the items 1, 2, and . . . . Measurement results or calculation results of the contents stored in the items 1, 2, and . . . are respectively stored in the fields of the values 1, 2, and . . . The field of the child ID and the parent ID are used to associate the measurement result of the geometric shape with the calculation result of the measurement candidate, and details thereof will be described hereinafter.

Returning to FIG. 4, under a condition that the user selects a plurality of icons of geometric shapes through the input device 195, the calculation instruction receiving unit 26 identifies a measurement candidate that holds true based on a combination of the selected geometric shapes. In this case, the calculation instruction receiving unit 26 identifies the measurement candidate corresponding to the combination of the selected geometric shapes based on a combination table 34 (FIG. 6) serving as a definition unit. This combination table 34 is information in which a plurality of geometric shapes are associated with measurement candidates that hold true based on a combination of the plurality of geometric shapes. Herein, as illustrated in FIG. 6, the measurement candidates are classified into an item (hereinafter referred to as a display item) displayed on the display device 193 in association with the measurement candidate identified by the combination of the geometric shapes selected by the user and a calculation item (hereinafter referred to as a calculation item) corresponding to each display item. Then, the calculation instruction receiving unit 26 causes, through the display control unit 122A, the display device 193 to display icons 501, 502, 503, and 504 (see icons indicated by broken lines in FIG. 12) of identified measurement candidates (display items) and diagrams 601, 602, and 603 (see figures indicated by broken lines in FIG. 12) indicating the measurement candidates. In this case, the display control unit 122A causes the icons indicating the measurement candidates to be selectably displayed. Note that, causing the icons indicating the measurement candidates to be selectably displayed by the display control unit 122A indicates the same meaning as causing the measurement candidates to be displayed. Note that, selecting the icons indicating the measurement candidates by the user indicates the same meaning as selecting the measurement candidates. Note that, the information in which a plurality of geometric shapes are associated with measurement candidates that hold true based on a combination of the plurality of geometric shapes is not limited to table data, and may be text data.

FIG. 6 illustrates a data structure of the combination table 34. As illustrated in FIG. 6, the combination table 34 includes fields of a combination of geometric shapes selected by a user and a measurement candidate (display item and calculation item). A combination of geometric shapes selectable by the user is comprehensively stored in the field of the combination of the geometric shapes. The field of the measurement candidate includes two fields of a display item and a calculation item. Information about a display item displayed on the display device 193 for a measurement candidate identified based on the combination of the geometric shapes selected by the user is stored in the field of the display item. Information about a measurement item (calculation item) calculated for the corresponding display item is stored in the field of the calculation item. For example, under a condition that the user selects two straight lines as a combination of measured geometric shapes through the input device 195, the display control unit 122A causes the display device 193 to selectably display an icon of "INTERSECTION OF TWO STRAIGHT LINES", an icon of "MEDIAN LINE", and an icon of "INSCRIBED CIRCLE" as display of measurement candidates (display items). In other words, the display control unit 122A causes the display device 193 to comprehensively display calculable candidates for measurement, based on the combination of the geometric shapes selected by the user.

Furthermore, in response to detecting that the user has selected any of the icons of the measurement candidates through the input device 195, the calculation instruction receiving unit 26 transmits information about the selected measurement candidate to the measurement item calculation unit 27.

The measurement item calculation unit 27 reads a measurement result of the geometric shape stored in the measurement result DB 32 based on the information about the measurement item selected by the user being received from the calculation instruction receiving unit 26, and calculates the measurement candidate based on the read measurement result. The measurement item calculation unit 27 stores the calculation result of the measurement item in the measurement result DB 32. Note that, a method for storing a calculation result of a measurement item in the measurement result DB 32 will be described hereinafter.

The calculation of a measurement candidate by the measurement item calculation unit 27 is performed by an existing calculation method. For example, under a condition that the calculation instruction receiving unit 26 detects that the user has selected the icon of "INTERSECTION OF TWO STRAIGHT LINES" among the icon of "INTERSECTION OF TWO STRAIGHT LINES", the icon of "MEDIAN LINE", and the icon of "INSCRIBED CIRCLE" displayed on the display device 193, the measurement item calculation unit 27 reads a measurement result of the two straight lines from the measurement result DB 32, and calculates "ANGLE OF INTERSECTION" and "COORDINATE VALUE OF INTERSECTION POINT" being calculation items of "INTERSECTION OF TWO STRAIGHT LINES".

For example, under a condition that the angle of the intersection of the two straight lines is calculated, the measurement item calculation unit 27 reads a unit vector of each of the two straight lines from the measurement result DB 32. Note that, it is assumed that a unit vector of one of the two straight lines is (v1x, v1y, v1z) and a unit vector of the other straight line is (v2x, v2y, v2z).

Next, the measurement item calculation unit 27 obtains an inner product of the two unit vectors from Expression (1) below, and calculates an angle of intersection by substituting the obtained inner product into Expression (2).

$$\text{Inner product} = (v1x \times v2x \times v1y \times v2y) \quad (1)$$

$$\text{Angle of intersection} = \arccos(\text{inner product}) \text{ [rad]} \quad (2)$$

Note that, the measurement candidates may not be classified into the display item and the calculation item. For example, the display item and the calculation item may be unified. For example, for the measurement candidate "INTERSECTION OF TWO STRAIGHT LINES", the display control unit 122A may cause the display device 193 to display, as display of the measurement candidate, an icon of "INTERSECTION OF TWO STRAIGHT LINES (COORDINATE VALUE)" or "INTERSECTION OF TWO STRAIGHT LINES (ANGLE OF INTERSECTION)" obtained by combining the display item and the calculation item. In this case, under a condition that the calculation instruction receiving unit 26 detects that the user has selected, for example, the icon of "INTERSECTION OF TWO STRAIGHT LINES (ANGLE OF INTERSECTION)", the measurement item calculation unit 27 may calculate only an angle of the intersection of the two straight lines.

Next, processing of the control unit 2 will be described with reference to the flowcharts in FIGS. 7 and 8.

Geometric Shape Measurement Processing

Figure 7:
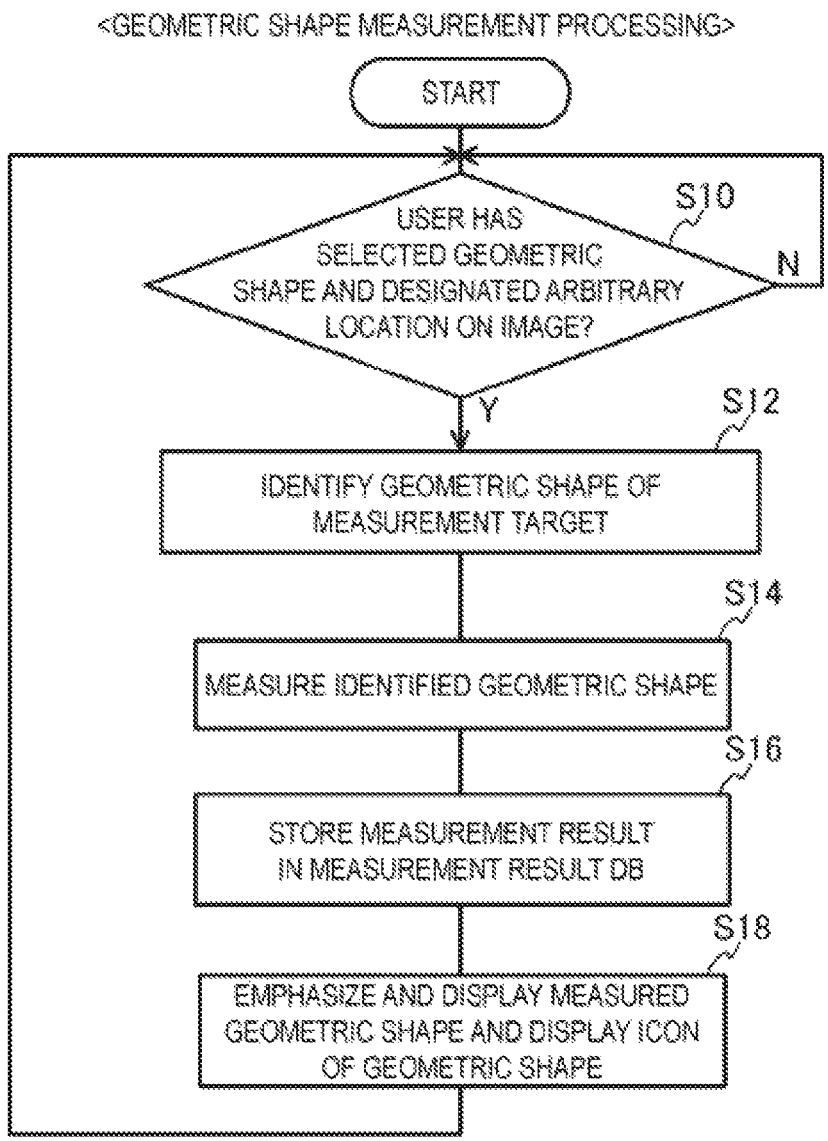
FIG. 7 is a flowchart illustrating geometric shape measurement processing.

FIG. 7 is the flowchart showing geometric shape measurement processing. Note that, it is assumed as a premise of the processing in FIG. 7 that processing of capturing an image of the measurement target 7 placed on the XY stage 5 has been completed under control of the image capturing control unit 21. It is also assumed that the display control unit 122A causes the display device 193 to display a screen (a screen including the image of the measurement target 7 and the menu 40) as illustrated in FIG. 9.

In the processing in FIG. 7, the selection receiving unit 23 waits until a user selects a geometric shape in the menu 40 through the input device 195 and also designates an arbitrary location on the image in Step S10. Note that, in response to receiving information that the user has selected the geometric shape and designated the arbitrary location on the image, the selection receiving unit 23 transmits the received information to the geometric shape measurement unit 25.

Under a condition that the geometric shape measurement unit 25 receives the information from the selection receiving unit 23, the processing proceeds to Step S12, and a geometric shape (contour) of the measurement target 7 in the image is identified based on a kind of the selected geometric shape and luminance values (signal intensities) of pixels around the designated location. For example, under a condition that the user selects the geometric shape "STRAIGHT LINE" in the menu 40 and selects a location indicated by a pointer 150 (solid-white arrow) in the screen of FIG. 9, the geometric shape measurement unit 25 identifies a linear geometric shape (that is, a straight line) in the geometric shape (contour) on the measurement target 7 in the vicinity of the pointer (the vicinity of the location selected by the pointer 150).

Next, in Step S14, the geometric shape measurement unit 25 measures the identified geometric shape by using the image of the measurement target 7. For example, under a condition that the geometric shape "STRAIGHT LINE" is selected, the geometric shape measurement unit 25 measures starting point coordinates, ending point coordinates, and the like of the linear geometric shape (that is, the straight line) located in the vicinity of the location designated by the user. Note that, under a condition that a geometric shape other than the straight line is selected, a measurement related to the geometric shape is also performed in a similar manner as described above. For example, under a condition that a geometric shape "CIRCLE" is selected, the geometric shape measurement unit 25 measures central coordinates, a diameter, and the like of a geometric shape (contour) closely resembling the circle.

Next, in Step S16, the geometric shape measurement unit 25 stores the measurement result in Step S14 in the measurement result DB 32 (see FIG. 5). For example, under a condition that the linear geometric shape (contour) is measured, the geometric shape measurement unit 25 stores values of the starting point coordinates and the ending point coordinates in the measurement result DB 32 as indicated by IDs=1 and 2 in FIG. 5A. Note that, it is assumed that nothing is stored in the fields of "CHILD ID" and "PARENT ID" at this stage.

Next, in Step S18, the display control unit 122A refers to the measurement result DB 32, and causes an icon indicating the geometric shape as geometric shape-related information to be selectably displayed (see the signs 42 and 44 in FIG. 10) while causing the measured geometric shape to be emphasized and displayed in the image in the display device 193 (see the signs 142 and 144 in FIG. 10). Subsequently, the processing returns to Step S10, and the processing and the determination in Steps S10 to S18 are repeatedly performed.

Note that, under a condition that the user performs a predetermined operation (for example, a click of a right mouse button) on an icon of a geometric shape (for example, the icon indicated by the sign 42 or 44) displayed on the display device 193 as illustrated in FIG. 10 through the input device 195, the display control unit 122A refers to the measurement result DB 32 and outputs the measurement result of the geometric shape for display. In this way, the user can appropriately view the measurement result of the geometric shape.

Processing of Calculating Measurement Candidate

Next, processing of calculating a measurement candidate will be described with reference to the flowchart in FIG. 8. A user has conventionally needed to perform the operations of first selecting a measurement item desired to be calculated from a menu screen in which many measurement items are listed and identifying a combination of geometric shapes needed to calculate the selected measurement item. Selecting a measurement item desired to be calculated from many measurement items has been an extremely complicated operation for the user, and operability for a measurement has been low. Some users have made a mistake in selecting a measurement item, and an inconvenience of failing to perform a desired measurement, for example, has occurred. Even under a condition that a measurement item has been able to be selected, the operation of selecting necessary geometric shapes to calculate the selected measurement item has been needed, which has resulted in poor operability for a measurement. For example, a beginner for measurement may have failed to calculate a desired measurement item due to low operability for a measurement. An expert for measurement also has needed time for the operation of measurement, and thus efficient calculation of a measurement item may have been hindered. Thus, the processing following the flowchart in FIG. 8 is performed in the present embodiment.

Figure 8:
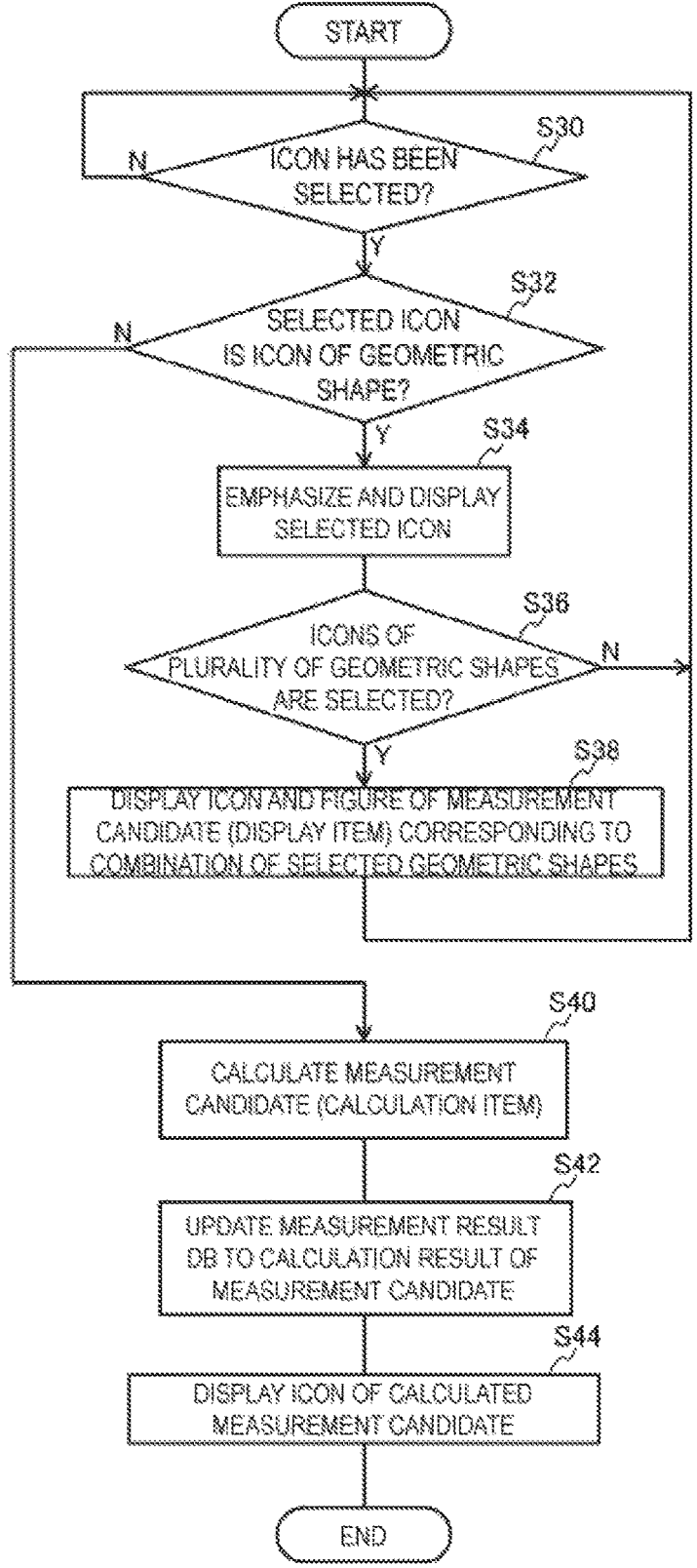
FIG. 8 is a flowchart showing processing of calculating a measurement candidate (measurement item) according to the first embodiment.

Note that, it is assumed as a premise of the processing in FIG. 8 that measurements of a plurality of geometric shapes have been completed in the flowchart of the geometric shape measurement processing in FIG. 7, and as illustrated in FIG. 10, the display device 193 displays a plurality of icons of geometric shapes as geometric shape-related information.

First, in Step S30 in FIG. 8, the calculation instruction receiving unit 26 waits until a user selects any of the icons displayed on the display device 193 through the input device 195. Note that, icons selectable by the user include an icon of a geometric shape and an icon of a measurement candidate.

Under a condition that any of the icons is selected and the processing proceeds to Step S32, the calculation instruction receiving unit 26 determines whether or not the selected icon is an icon of a geometric shape. Under a condition that the determination is denied in Step S32, the processing proceeds to Step S40. Under a condition that the determination is confirmed, the processing proceeds to Step S34.

Figure 11:
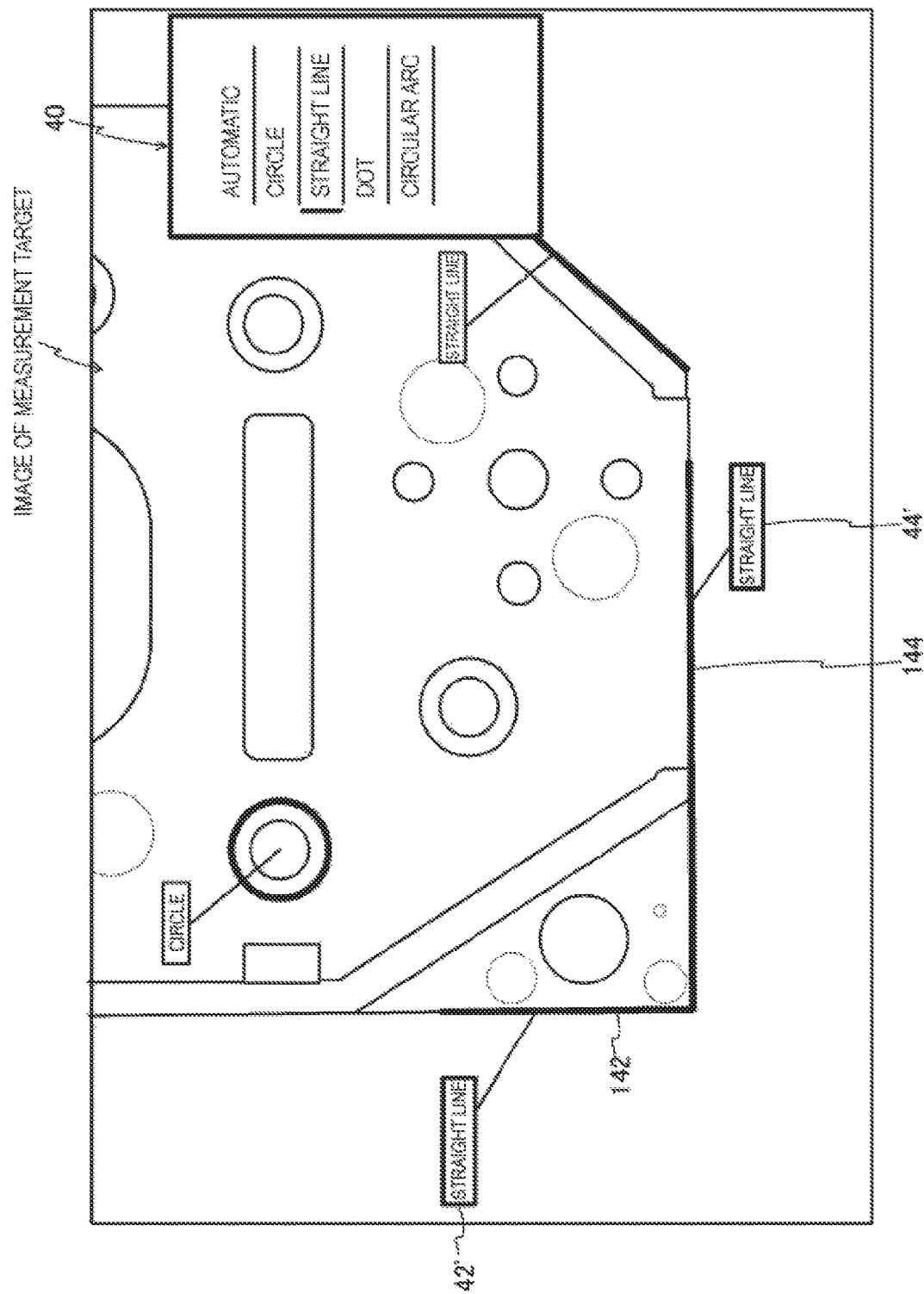
FIG. 11 is a diagram (part three) illustrating a display example of the display device.

Under a condition that the processing proceeds to Step S34, that is, under a condition that the user has selected the icon of the geometric shape, the calculation instruction receiving unit 26 emphasizes and displays the selected icon as indicated by signs 42' and 44' in FIG. 11.

Next, in Step S36, the calculation instruction receiving unit 26 determines whether or not icons of a plurality of geometric shapes are selected. Under a condition that the determination in Step S36 is denied, the processing returns to Step S30, and the processing and the determination in Steps S30 to S36 described above are repeated. Under a condition that the determination in Step S36 is confirmed, the processing proceeds to Step S38.

Figure 12:
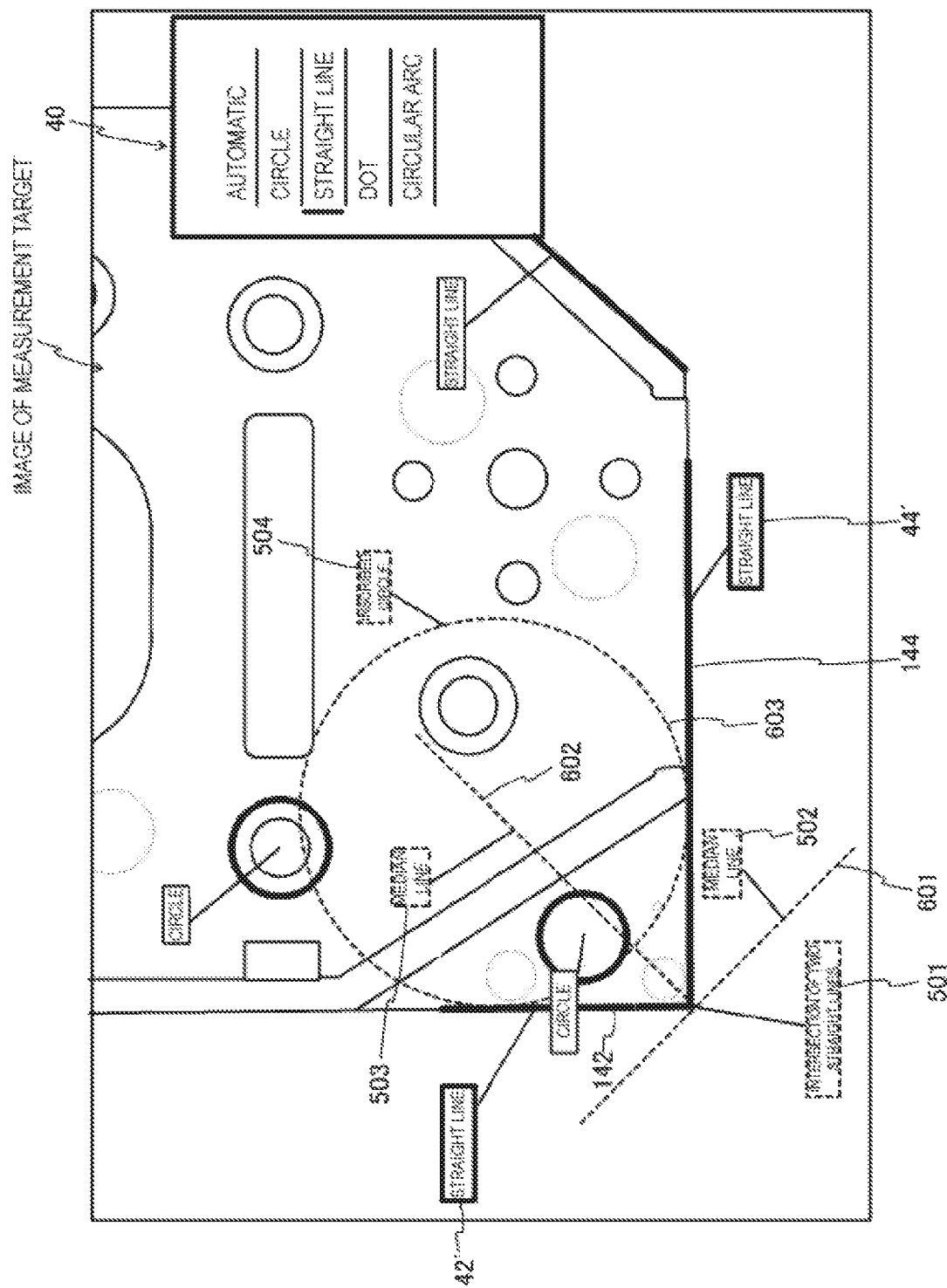
FIG. 12 is a diagram (part four) illustrating a display example of the display device.

Under a condition that the processing proceeds to Step S38, that is, under a condition that the icons of the plurality of geometric shapes are selected, the calculation instruction receiving unit 26 refers to the combination table 34 in FIG. 6, and identifies a measurement candidate (display item) based on geometric shapes (that is, a combination of geometric shapes) respectively corresponding to the icons of the plurality of selected geometric shapes. Then, the calculation instruction receiving unit 26 causes the display device 193 to display the icon of the identified measurement candidate (display item) through the display control unit 122A. The display control unit 122A also causes the display device 193 to display a figure indicating the identified measurement candidate. For example, it is assumed that the user selects two icons of straight lines as geometric shape-related information, as illustrated in FIG. 11. In this case, the calculation instruction receiving unit 26 refers to the combination table 34 in FIG. 6, reads measurement candidates (that is, median line, intersection of two straight lines, and inscribed circle as display items) based on two straight lines ("STRAIGHT LINES×2" in FIG. 6) as geometric shapes corresponding to the icons of the two selected straight lines, and displays icons 501 to 504 and diagrams 601 to 603 (see locations in broken lines in FIG. 12) of the candidates (display items) as illustrated in FIG. 12. The processing returns to Step S30 after Step S38.

Note that, under a condition that the combination table 34 does not include a measurement candidate based on a combination of geometric shapes corresponding to icons of selected geometric shapes, the calculation instruction receiving unit 26 does not display a measurement candidate on the display device 193 and the processing returns to Step S30. Note that, in the absence of a measurement candidate, the calculation instruction receiving unit 26 may display the absence of the measurement candidate (display a warning) on the display device 193 through the display control unit 122A.

Under a condition that the determination in Step S32 is denied, that is, under a condition that the user has selected the icon of the measurement candidate (display item) in a situation where the icons of the measurement candidates (display items) are displayed as illustrated in FIG. 12, the calculation instruction receiving unit 26 transmits information about the selected measurement candidate (information about a calculation item corresponding to the display item) to the measurement item calculation unit 27, and the processing proceeds to Step S40. Under a condition that the processing proceeds to Step S40, the measurement item calculation unit 27 reads a measurement result of a geometric shape used to calculate the selected measurement candidate (calculation item) from the measurement result DB 32, and calculates the measurement candidate (calculation item).

For example, it is assumed that the two straight lines are selected as mentioned above, and the icon 501 of "INTERSECTION OF TWO STRAIGHT LINES" in the measurement candidates (display items) illustrated in FIG. 12 is then selected. In this case, the measurement item calculation unit 27 reads a measurement result of the two selected straight lines from the measurement result DB 32 in FIG. 5A, and calculates measurement items of "INTERSECTION OF TWO STRAIGHT LINES" (coordinate value of intersection point and angle of intersection that are items associated with the display item "INTERSECTION OF TWO STRAIGHT LINES" in FIG. 6) based on the read measurement result.

Next, in Step S42, the measurement item calculation unit 27 updates the measurement result DB 32 to a calculation result of the measurement candidate. For example, under a condition that the measurement result DB 32 before the update stores data as in FIG. 5A, the measurement item calculation unit 27 adds a new row (ID=record of N) as illustrated in FIG. 5B to the lowest row of the measurement result DB 32 in FIG. 5A. In this case, as indicated by ID=record of "N" in FIG. 5B, the measurement item calculation unit 27 stores "INTERSECTION OF TWO STRAIGHT LINES" in the field of the geometric shape, stores "COORDINATE VALUE" in the field of the item 1, and stores calculation values "xN, yN, zN" of coordinates of an intersection point in the field of the value 1. The measurement item calculation unit 27 also stores "ANGLE OF INTERSECTION" in the field of the item 2, and stores a calculation value "a" of the angle of intersection of the two straight lines in the field of the value 2. Then, the measurement item calculation unit 27 stores IDs (herein, ID=1 and 2) of the geometric shapes used to calculate the measurement candidate in the field of the parent ID. Furthermore, the measurement item calculation unit 27 stores an ID (herein, ID of the measurement candidate "INTERSECTION OF TWO STRAIGHT LINES"=N) of a calculation result of the measurement candidate in the field of "CHILD ID" of the geometric shapes (ID=1 and 2) used in the calculation. In this way, information about the processing of calculating a measurement candidate can be appropriately managed by associating a measurement result of a geometric shape with a calculation result of a measurement candidate by using the child ID and the parent ID.

Figure 13:
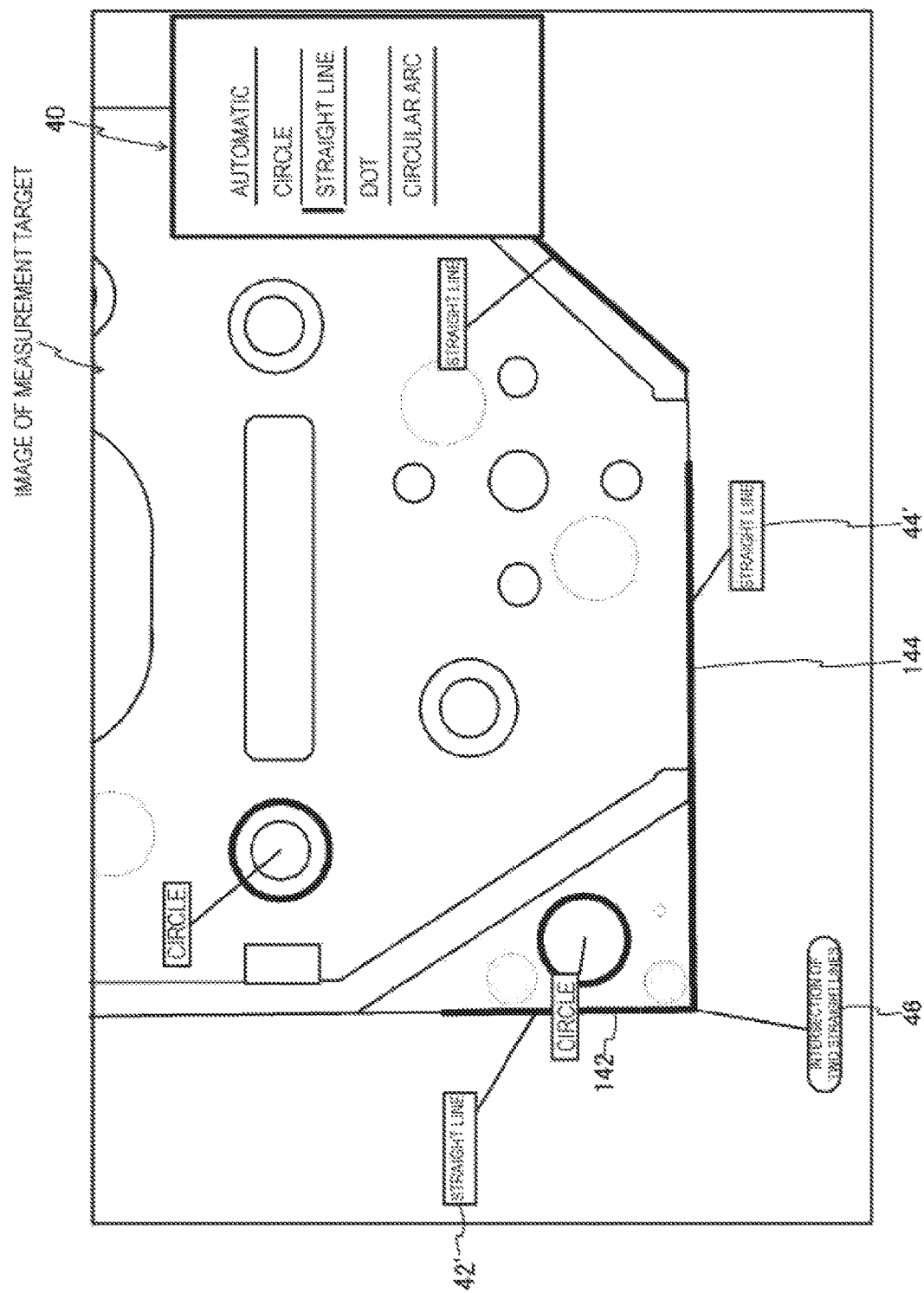
FIG. 13 is a diagram (part five) illustrating a display example of the display device.

Next, the processing proceeds to Step S44, the display control unit 122A refers to the measurement result DB 32, and displays an icon of the calculated measurement candidate (see a sign 46 in FIG. 13) as illustrated in FIG. 13.

As described above, the whole processing in FIG. 8 is terminated, but the processing in FIG. 8 is repeatedly performed until the whole measurement processing is terminated (until the user provides a termination instruction).

Note that, under a condition that the user performs a predetermined operation (for example, a click of a right mouse button) on an icon (such as signs 42' and 44' in FIG. 13) of a geometric shape and an icon (such as the sign 46 in FIG. 13) of a calculated measurement candidate (measurement item) through the input device 195, the calculation result output unit 122B refers to the measurement result DB 32, and outputs the measurement result of the geometric shape and the calculation result of the measurement candidate (measurement item) for display on the display device 193. In this way, the user can appropriately view the measurement result of the geometric shape and the calculation result of the measurement candidate.

As described above in detail, according to the first embodiment, the display control unit 122A causes an icon of a geometric shape in the measurement target 7 to be selectably displayed, and causes a measurement candidate (display item) of the measurement target 7 based on a geometric shape corresponding to the icon of the selected geometric shape to be selectably displayed on the display device 193. Then, the measurement item calculation unit 27 outputs a calculation result of the selected measurement candidate (calculation item) for display on the display device 193. In this way, the user can input an instruction to calculate the measurement candidate (measurement item) by such an intuitive and simple operation that selects icons of a plurality of geometric shapes on an image of the measurement target 7 displayed on the display device 193 for a portion of the measurement target 7 desired to be measured and selects a specific measurement candidate (measurement item) desired by the user from measurement candidates displayed on the display device 193. Therefore, only candidates for a calculable measurement item for the portion desired to be measured by the user among many measurement items can be selectably displayed. Thus, an instruction to calculate a desired measurement item can be intuitively and simply input without a complicated operation of selecting a specific measurement item from many measurement items. Further, an instruction to calculate a measurement candidate (measurement item) can be intuitively input without an operation that requires a lot of time and effort for identifying a combination of geometric shapes necessary to calculate a measurement candidate (measurement item) selected by a user. As a result, according to the first embodiment, operability of a user in operation for a measurement can be improved. Therefore, a beginner for a measurement, in particular, among users can reliably perform a measurement of a portion desired to be measured in the measurement target 7. Meanwhile, an expert for a measurement can efficiently perform a measurement of a portion desired to be measured.

According to the first embodiment, the calculation instruction receiving unit 26 refers to the combination table 34 defined by associating a combination of geometric shapes with a measurement candidate, identifies a measurement candidate to be displayed, and displays the measurement candidate through the display control unit 122A. Thus, a measurement candidate that needs to be displayed can be easily and appropriately identified.

Note that, in the first embodiment, after the geometric shape measurement unit 25 measures a geometric shape (Step S14), the display control unit 122A may not cause the display device 193 to display an icon of the geometric shape (geometric shape-related information) in the geometric shape measurement processing (FIG. 7). For example, an icon of a geometric shape may be displayed before the geometric shape is measured. In this case, after the geometric shape measurement unit 25 identifies a geometric shape (Step S12), the display control unit 122A may cause the display device 193 to selectably display an icon of the identified geometric shape (geometric shape-related information). In this case, under a condition that the measurement item calculation unit 27 calculates a measurement candidate (measurement item) (Step S40), the geometric shape measurement unit 25 may measure a geometric shape corresponding to the measurement candidate (measurement item) to be calculated in the processing of calculating a measurement candidate (FIG. 8).

In the first embodiment, the case is described where, under a condition that a user selects a combination of measured geometric shapes, the display control unit 122A displays an icon of a measurement candidate (display item), and under a condition that a user selects an icon of a measurement candidate (display item), the measurement item calculation unit 27 calculates a calculation item corresponding to the selected measurement candidate (display item). However, this is not limited thereto. Under a condition that the display control unit 122A causes an icon of a measurement candidate (display item) to be displayed, the measurement item calculation unit 27 may calculate all calculation items corresponding to the displayed measurement candidate (display item) and store all the calculation items in the measurement result DB 32. In this case, the calculation result output unit 122B may cause a calculation result of the measurement candidate (calculation item) stored in the measurement result DB 32 to be displayed on the display device 193 in response to a request from a user.

Note that, the measurement item calculation unit 27 calculates all calculation items corresponding to a measurement candidate (display item) in the first embodiment, but all measurement candidates (calculation items) may not be calculated. For example, under a condition that a user selects an icon of a measurement candidate (display item), the display control unit 122A may cause the display device 193 to selectably display a list of calculation items corresponding to the measurement candidate (display item). Then, the calculation instruction receiving unit 26 may transmit information about the measurement candidate (calculation item) selected by the user to the measurement item calculation unit 27, and the measurement item calculation unit 27 may calculate the selected calculation item.

In the first embodiment, the case where an icon indicating a measured geometric shape is selectably displayed as geometric shape-related information selectable by a user in order to identify a measurement item is described (see FIG. 10). However, this is not limited thereto. The geometric shape-related information selectable by the user may be, for example, a list of geometric shapes, which have been measured, displayed on the display device 193. In this case, the user selects an arbitrary geometric shape on the displayed list of the geometric shapes. To associate a position of the geometric shape that has been measured with the geometric shape on the list, a number may be provided to the geometric shape (emphasized and displayed contour) that has been measured on the image of the measurement target 7, and the same number may be given to the corresponding geometric shape on the list. Further, the geometric shape-related information selectable by the user may be an image of a geometric shape in the image of the measurement target 7. In this case, for example, an image (for example, the signs 142 and 144 in FIG. 10) of the geometric shape emphasized and displayed on the image of the measurement target 7 may be selectable.

Note that, the display control unit 122A causes the display device 193 to selectably display an icon indicating a measurement candidate as one example in which a measurement candidate is selectably displayed in the first embodiment, but an icon indicating a measurement candidate may not be used. For example, the display control unit 122A may cause the display device 193 to display a list of measurement candidates identified by selection of a geometric shape, and a user may select a measurement candidate (measurement item) to be calculated from the list. Further, for example, the display control unit 122A may cause the display device 193 to selectably display the diagrams 601 to 603 (see FIG. 12) indicating the measurement candidates identified by the selection of the geometric shape, and a measurement candidate corresponding to a desired figure selected by the user may be calculated. Note that, causing the list and the figures indicating the measurement candidates to be selectably displayed in addition to the icons of the measurement candidates by the display control unit 122A indicates the same meaning as selectably displaying the measurement candidates.

In the first embodiment, the case where the calculation result output unit 122B outputs a calculation result calculated by the measurement item calculation unit 27 for display on the display device 193 is described, but this is not limited thereto. For example, the calculation result output unit 122B may output a calculation result as a file. A format of a file may be, for example, a text format, a CSV format, an HTML format, and the like. Further, for example, the calculation result output unit 122B may output a calculation result as a paper medium through an external apparatus such as a printer, which is not illustrated.

Variation

The case as follows is described in the first embodiment. With icons of geometric shapes (geometric shape-related information) being selectably displayed, under a condition that a user selects icons of a plurality of geometric shapes, icons of measurement candidates (display items) based on a combination of the geometric shapes corresponding to the icons of the selected geometric shapes is selectably displayed. Under a condition that the user then selects any of the icons of the measurement candidate (display items), the measurement candidate (display item) is calculated. However, this is not limited thereto. With icons of geometric shapes (geometric shape-related information) being selectably displayed, under a condition that the user selects an icon of one geometric shape, measurement items (see FIG. 2) that can be measured from one geometric shape corresponding to the icon of the selected one geometric shape may be set as measurement candidates. In this case, under a condition that icons of the measurement items based on the one geometric shape selected through the icon are displayed as icons of measurement candidates on the display device 193 and the user selects any of the icons of the measurement candidates, a calculation result of the measurement candidate may be output. The present variation can be achieved by partially changing the processing in FIGS. 7 and 8. Hereinafter, details will be described by using FIGS. 7 and 8.

Geometric Shape Measurement Processing

In the present variation, in Step S10 in the processing in FIG. 7, the selection receiving unit 23 waits until a user selects a geometric shape in the menu 40 through the input device 195 and also designates an arbitrary location on the image. Under a condition that the selection and the designation are performed by the user and the processing proceeds to Step S12, the geometric shape measurement unit 25 calculates coordinates of a point sequence (point sequence data) on a contour of the measurement target 7 and also identifies a geometric shape as described above. For example, under a condition that the user selects a circle as a geometric shape and designates an arbitrary location on the image, coordinates of a point sequence on a contour of the circle are calculated, and the point sequence (that is, a geometric shape) on the contour is identified as the circle. Note that, it is assumed that Step S14 is not performed in the present variation.

Next, in Step S16, the geometric shape measurement unit 25 stores information about the point sequence data acquired in Step S12 in a database. Next, in Step S18, the display control unit 122A refers to the database, causes the geometric shape to be emphasized and displayed in the image on the display device 193, and also causes an icon (geometric shape-related information) indicating the geometric shape (such as a circle, a straight line, a dot, and a circular arc) to be selectably displayed. Subsequently, the processing returns to Step S10, and the processing and the determination in Steps S10 to S18 (however, except for Step S14) are repeatedly performed.

Processing of Calculating Measurement Candidate

In the processing in FIG. 8 in the present variation, first, in Step S30, the calculation instruction receiving unit 26 waits until a user selects an icon displayed on the display device 193 through the input device 195. Under a condition that an icon indicating a geometric shape is selected and the processing proceeds to Step S32, the calculation instruction receiving unit 26 determines whether or not the selected icon is an icon of a geometric shape. Under a condition that the determination is denied in Step S32, the processing proceeds to Step S40. Under a condition that the determination is confirmed, the processing proceeds to Step S38 (Steps S34 and 36 are not performed in the present variation).

Under a condition that the processing proceeds to Step S38, the calculation instruction receiving unit 26 refers to the measurement item list in FIG. 2, and identifies a measurement candidate (measurement item in FIG. 2) based on a geometric shape corresponding to the icon of the selected geometric shape. Then, the calculation instruction receiving unit 26 causes the display device 193 to display an icon of the identified measurement candidate through the display control unit 122A. For example, under a condition that the user selects an icon of a circle as a geometric shape, icons of central coordinates, a diameter (radius), and circularity are displayed as icons of measurement candidates on the display device 193. Subsequently, the processing returns to Step S30.

On the other hand, under a condition that the determination in Step S32 is denied, that is, under a condition that the user has selected the icon of the measurement candidate in a situation where the icon of the measurement candidate is displayed, the calculation instruction receiving unit 26 transmits information about the selected measurement candidate to the measurement item calculation unit 27, and the processing proceeds to Step S40.

Under a condition that the processing proceeds to Step S40, the measurement item calculation unit 27 reads information about point sequence data about a geometric shape used to calculate the selected measurement candidate from the database, and calculates the measurement candidate (measurement item). Herein, the measurement item (measurement item) calculated by the measurement item calculation unit 27 is the measurement item exemplified in FIG. 2. Next, in Step S42, the measurement item calculation unit 27 updates the database to a calculation result of the measurement candidate (measurement item). Next, in Step S44, the display control unit 122A refers to the database, and causes an icon of the calculated measurement candidate (measurement item) to be displayed. Note that, under a condition that the user performs a predetermined operation (for example, a click of a right mouse button) on the icon of the measurement candidate (measurement item) through the input device 195, the calculation result output unit 122B refers to the database, and outputs the calculation result of the measurement candidate (measurement item) for display on the display device 193. As described above, the whole processing in FIG. 8 is terminated, but the processing in FIG. 8 is repeatedly performed.

Note that, since the user can freely select icons of a plurality of geometric shapes measured and displayed by an instruction of the pointer 150 (solid-white arrow) in the screen of FIG. 9 in the first embodiment, the combination table 34 may not include a combination of the selected geometric shapes (for example, the reason is that any physical quantity cannot be calculated from a combination of the selected geometric shapes), and a measurement candidate (display item) may not be displayed in Step S38. A second embodiment as follows may be adopted to avoid an occurrence of such a situation and to further improve operability for calculating a measurement candidate (measurement item).

Second Embodiment

Figure 16:
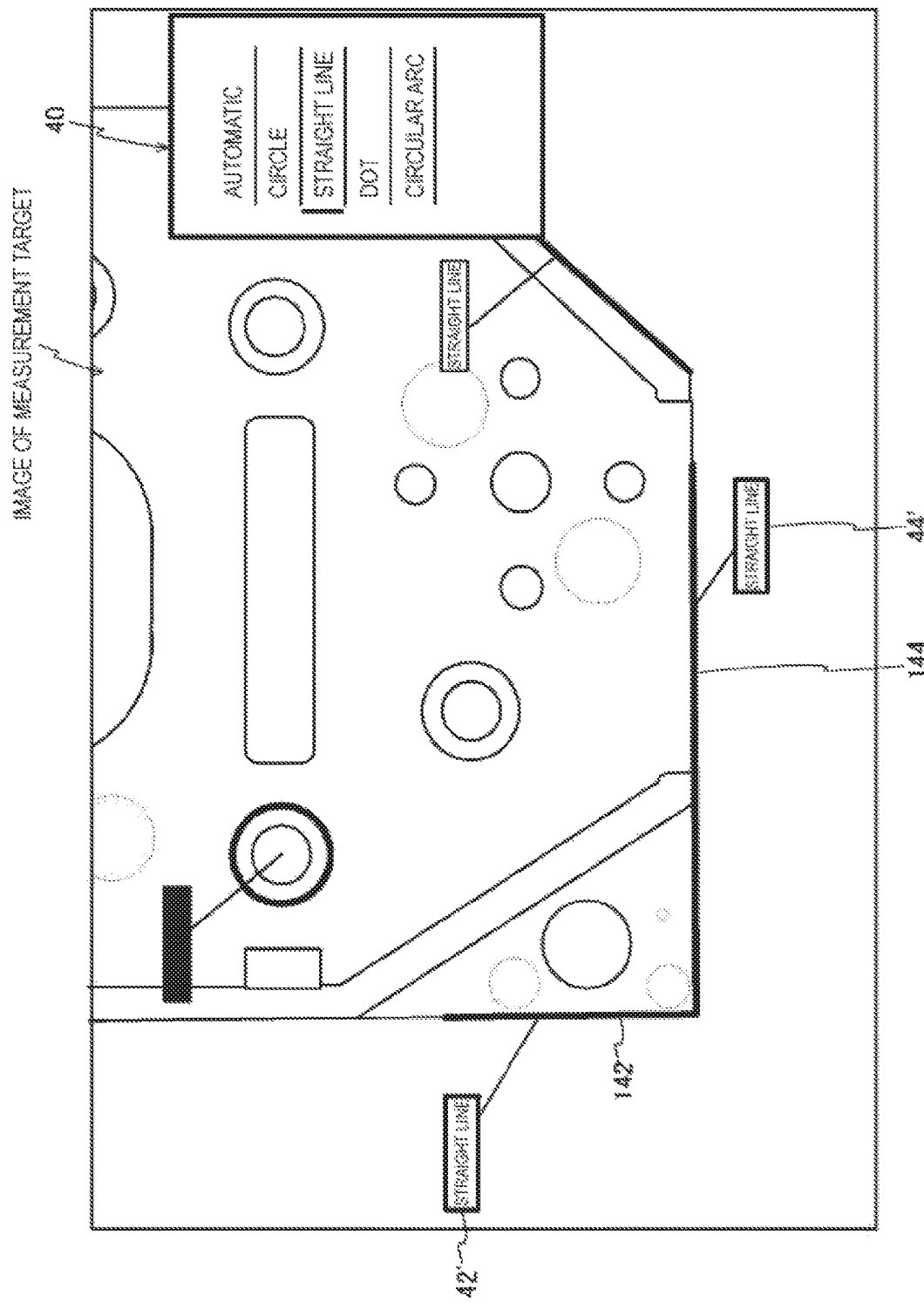
FIG. 16 is a diagram illustrating a display example of a display device in the second embodiment.

Hereinafter, the second embodiment will be described in detail based on FIGS. 14 to 16. Note that, an image measurement device in the second embodiment has the same configuration as that of the image measurement device 100 in the first embodiment as described above.

Figure 14:
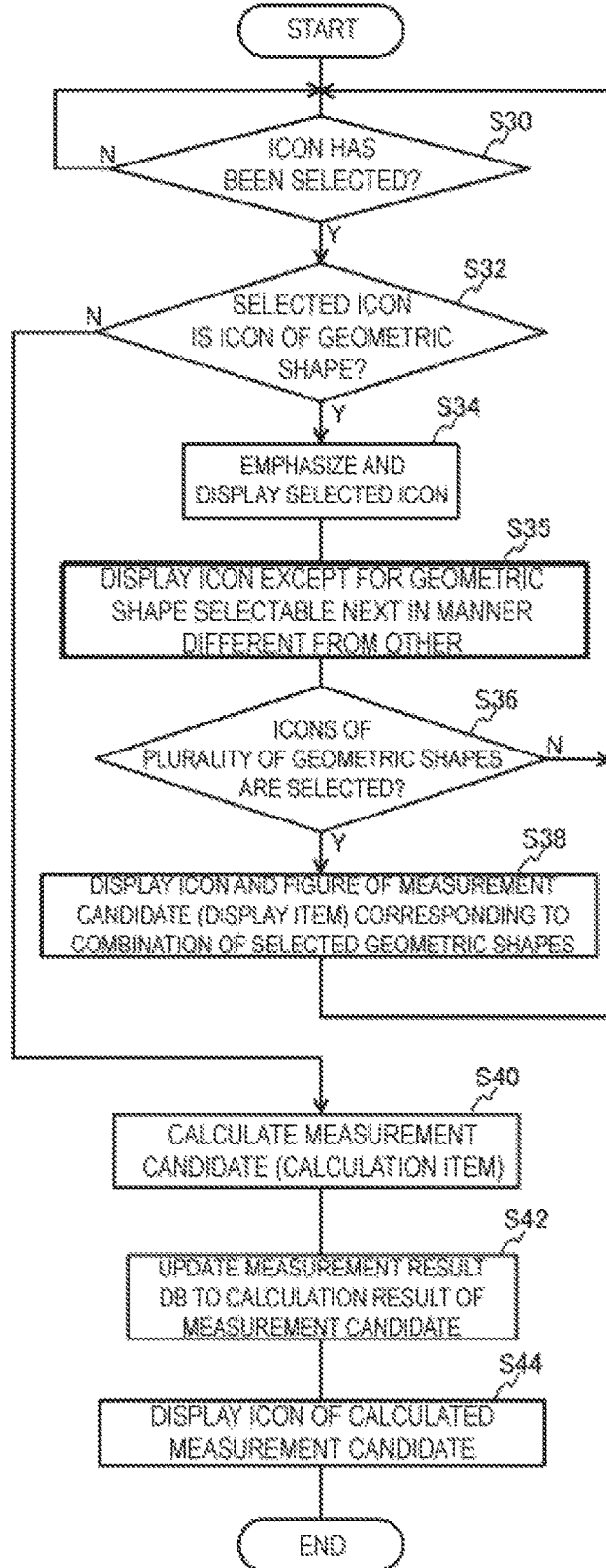
FIG. 14 is a flowchart showing processing of calculating a measurement candidate (measurement item) according to a second embodiment.

In the second embodiment, processing along a flowchart in FIG. 14 is performed instead of the processing in FIG. 8 described in the first embodiment. The processing in FIG. 14 is different from the processing in FIG. 8 in that processing in Step S35 is performed between the processing in Steps S34 and S36. Further, it is assumed in the second embodiment that the calculation instruction receiving unit 26 uses a combination table 134 illustrated in FIG. 15 instead of the combination table 34 in FIG. 6. Note that, a geometric shape selectable next (geometric shape including a measurement candidate under a condition that selection continues) in addition to a calculable measurement item (display item and calculation item) are associated with a combination of geometric shapes and defined in the combination table 134 in FIG. 15. For example, it is defined in the combination table 134 that, under a condition that a user has already selected two dots, the user can further select "DOT" and/or "STRAIGHT LINE", and under a condition that the user has already selected two straight lines, the user can further select "STRAIGHT LINE".

In the processing in FIG. 14, under a condition that an icon of one or a plurality of geometric shapes (geometric shape-related information) is selected, the calculation instruction receiving unit 26 refers to the combination table 134 in FIG. 15 and identifies a geometric shape selectable next in Step S35. Then, the calculation instruction receiving unit 26 displays, through the display control unit 122A, an icon except for the identified geometric shape (that is, an icon of a geometric shape without a geometric shape selectable next) in a state different from the icon of the identified geometric shape.

For example, as illustrated in FIG. 11, it is assumed that the user has selected icons of two straight lines (geometric shape-related information). In this case, in Step S35, the calculation instruction receiving unit 26 refers to the combination table 134, and identifies "STRAIGHT LINE" as a geometric shape that can be combined with the two straight lines corresponding to the icons of the two straight lines. Then, the calculation instruction receiving unit 26 displays, through the display control unit 122A, an icon of a geometric shape (icon of a circle in FIG. 11) of geometric shapes that have not yet selected in FIG. 11 except for "STRAIGHT LINE" in a state different from an icon of unselected "STRAIGHT LINE". In this case, for example, a masked icon of the circle may be displayed as illustrated in FIG. 16. Alternatively, the icon of the circle may be displayed in a color or a concentration different from that of the icon of the unselected straight line.

Note that, the processing after Step S36 is performed similarly to the aforementioned first embodiment after Step S35. Note that, Step S35 may be performed after Step S36 is denied or after the processing in Step S38.

As described above, according to the second embodiment, a geometric shape that cannot be used in the processing of calculating a measurement candidate by being combined with a geometric shape corresponding to an icon of an already selected geometric shape is displayed so as not to be selected by a user. Thus, a user can be prevented from selecting a geometric shape that does not need to be selected, and can efficiently select a geometric shape. Therefore, operability for calculating a measurement candidate (measurement item) can be further improved.

Note that, an icon of a geometric shape that cannot be selected next may be displayed so as not to be selected in the second embodiment. In other words, an icon that cancels a selection operation by a user may be displayed.

In the second embodiment, the case where a geometric shape that cannot be used in the processing of calculating a measurement candidate by being combined with an already selected geometric shape is displayed in a state different from a geometric shape that can be used in the calculation processing is described, but this is not limited thereto. For example, an icon of a geometric shape that cannot be used in the processing of calculating a measurement candidate by being combined with an already selected geometric shape may be hidden from display. A mark, a character, a symbol, and the like may be displayed on at least one of an icon of a geometric shape selectable next and an icon of a geometric shape that cannot be selected next such that a user can distinguish between the icons. For example, an icon of "CIRCLE" provided with a cross may be displayed in the example of FIG. 16. A display state or a display appearance of at least one of an icon of a geometric shape selectable next and an icon of a geometric shape that cannot be selected next may be changed with a lapse of time since the icon is displayed. For example, a blinking icon may be displayed.

Note that, in the second embodiment, a measurement-finished geometric shape that has been finished with measurement is displayed so that a user can not select information about a geometric shape, among the measurement-finished geometric shape, that cannot be used in the processing of calculating a measurement candidate by being combined with an already selected geometric shape, but information about a geometric shape may not be prevented from being selected at a stage before selection. For example, in the geometric shape measurement processing in FIG. 7, under a condition that a geometric shape in a location different from a geometric shape that has already been finished with measurement is identified in the presence of the geometric shape that has finished with measurement (Step S12), and a measurement candidate cannot be calculated by combining the identified geometric shape with the geometric shape that has already been finished with measurement, the processing may not proceed to step after the identification of the geometric shape, and a user may be notified that the identified geometric shape cannot be used for calculating a measurement candidate.

Note that, the second embodiment may be appropriately combined with at least one of the above-described first embodiment, embodiments described hereinafter, and the variations.

The case where a measurement candidate that can be measured based on a plurality of selected geometric shapes is identified based on the combination tables 34 and 134 and displayed on the display device 193 is described in the aforementioned first and second embodiments. However, an appropriate value may not be obtained from some measurement candidates depending on a combination of selected geometric shapes. A third embodiment described below may be adopted to prevent a user from selecting such a measurement candidate from which an appropriate value cannot be obtained and to further improve operability for calculating a measurement candidate (measurement item).

Third Embodiment

Hereinafter, the third embodiment will be described in detail based on FIGS. 17 to 20. Note that, an image measurement device in the third embodiment has the same configuration as that of the image measurement device 100 in the first embodiment as described above.

Figure 17:
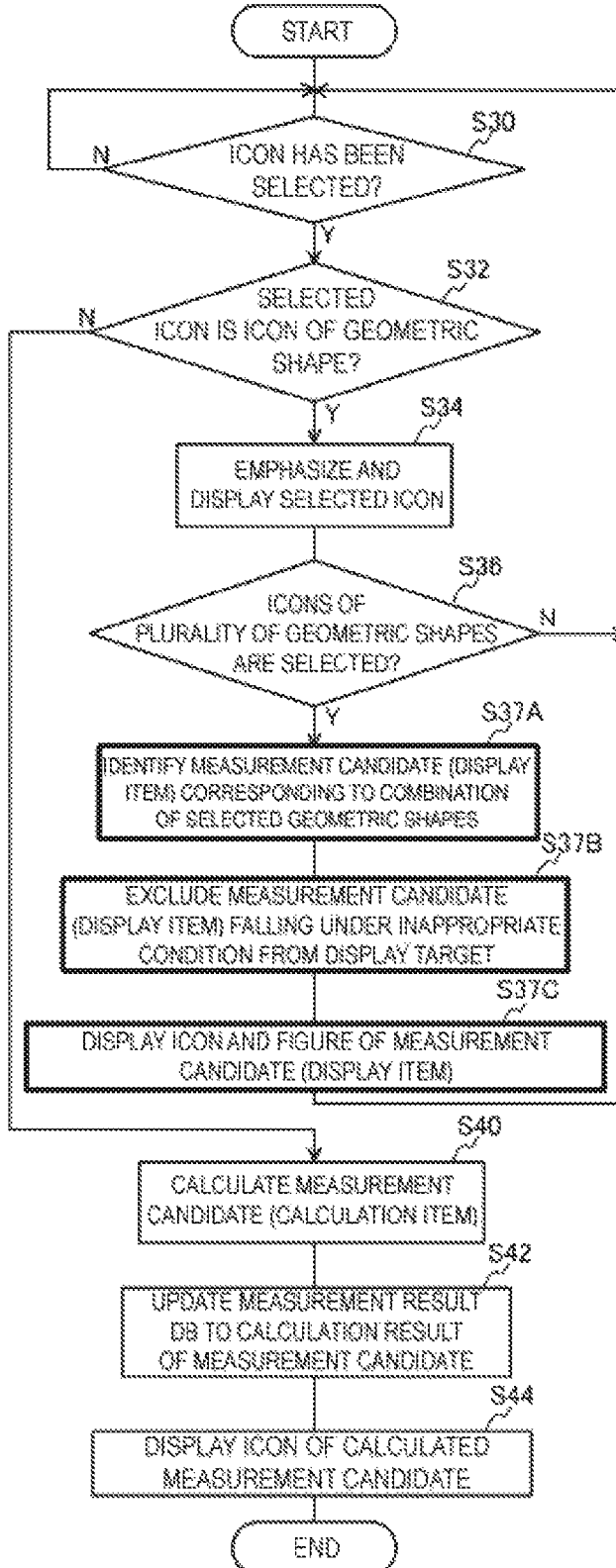
FIG. 17 is a flowchart showing processing of calculating a measurement candidate (measurement item) according to a third embodiment.

In the third embodiment, processing along a flowchart in FIG. 17 is performed instead of the processing in FIG. 8 described in the first embodiment. Processing in Steps S37A to S37C instead of Step S38 in FIG. 8 is performed in the processing in FIG. 17. Further, it is assumed that a combination table 234 illustrated in FIG. 18 instead of the combination table 34 in the first embodiment is used in the third embodiment. Note that, an inappropriate condition for a candidate is defined for each measurement candidate in the combination table 234 in FIG. 18. Although details will be described hereinafter, details of conditions such as "DETERMINATION CONDITION OF STRAIGHT LINE" and "DETERMINATION CONDITION OF CIRCLE" defined in "INAPPROPRIATE CONDITION FOR CANDIDATE" in FIG. 18 are as shown in a table in FIG. 19.

Under a condition that the determination in Step S36 is confirmed in the processing in FIG. 17, that is, under a condition that a user selects icons of a plurality of geometric shapes (geometric shape-related information), the processing proceeds to Step S37A. In Step S37A, the calculation instruction receiving unit 26 identifies a measurement candidate corresponding to a combination of geometric shapes corresponding to the icons of the plurality of selected geometric shapes. For example, it is assumed that the user has selected icons of two circles. In this case, the calculation instruction receiving unit 26 refers to the combination table 234 (FIG. 18), and identifies "INTERSECTION OF CIRCLE AND CIRCLE", and/or "TANGENT TO CIRCLE AND CIRCLE".

Next, in Step S37B, the calculation instruction receiving unit 26 excludes a measurement candidate that falls under an inappropriate condition for a candidate. For example, under a condition that the user has selected icons of two circles, "DETERMINATION CONDITION OF INTERSECTION OF CIRCLE AND CIRCLE" and "DETERMINATION CONDITION OF TANGENT TO CIRCLE AND CIRCLE" are checked from the combination table 234 (FIG. 18). Under a condition that the icons satisfy the determination conditions, measurement candidates corresponding to the determination conditions are excluded. The excluded measurement candidates are not targets to be displayed as icons.

Figure 20A:
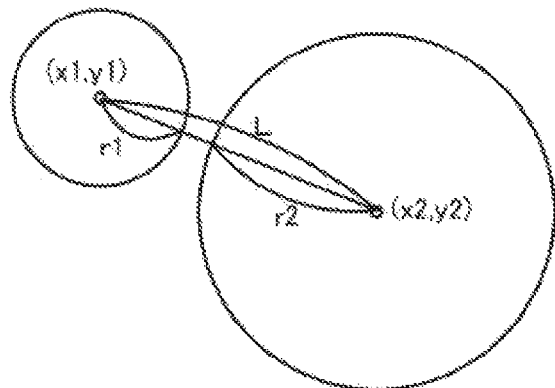
FIGS. 20A to 20D are diagrams for each describing a case of an inappropriate measurement candidate (measurement item).
Figure 20B:
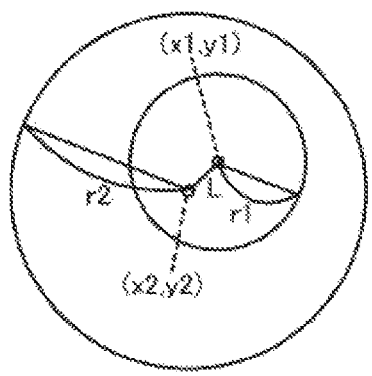

Herein, with regard to "DETERMINATION CONDITION OF INTERSECTION OF CIRCLE AND CIRCLE", "CHECK WHETHER CIRCLES INTERSECT BASED ON DATA ABOUT TWO CIRCLES" is defined as a calculation method, and "INAPPROPRIATE WITHOUT INTERSECTION POINT" is defined as a determination condition in the table in FIG. 19. Thus, the calculation instruction receiving unit 26 determines whether the two circles satisfy conditions illustrated in FIGS. 20A and 20B, for example, and excludes, under a condition that any of the conditions is satisfied, "INTERSECTION OF CIRCLE AND CIRCLE" from measurement candidates. FIG. 20A illustrates a case where two circles are located away from each other. Under a condition that a total of radii r1 and r2 of respective circles calculated based on a measurement result of geometric shapes (two circles) is shorter than a distance L between centers of the respective circles, the calculation instruction receiving unit 26 determines that there is no intersection point. FIG. 20B illustrates a case where one circle is located in the other circle. Under a condition that an absolute value of a difference between radii r1 and r2 of respective circles calculated based on a measurement result of geometric shapes (two circles) is greater than a value of a distance L between centers of the respective circles, the calculation instruction receiving unit 26 determines that there is no intersection point.

Figure 20C:
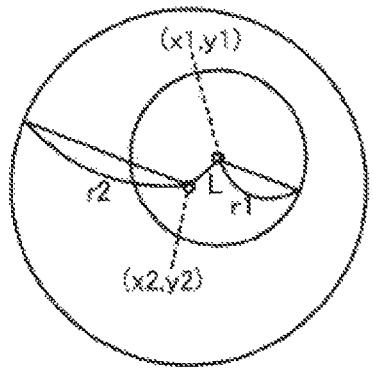

With regard to "DETERMINATION CONDITION OF TANGENT TO CIRCLE AND CIRCLE", "CHECK WHETHER THERE IS TANGENT BASED ON DATA ABOUT TWO CIRCLES" is defined as a calculation method, and "INAPPROPRIATE WITHOUT TANGENT" is defined as a determination condition in the table in FIG. 19. Thus, the calculation instruction receiving unit 26 determines whether the two circles satisfy a condition illustrated in FIG. 20C, and excludes, under a condition that the condition is satisfied, TANGENT TO CIRCLE AND CIRCLE" from measurement candidates. Specifically, as illustrated in FIG. 20C, under a condition that an absolute value of a difference between radii r1 and r2 of respective circles calculated based on a measurement result of geometric shapes (two circles) is greater than a value of a distance L between centers of the respective circles, the calculation instruction receiving unit 26 determines that there is no tangent.

Then, the processing proceeds to Step S37C in FIG. 17, and the calculation instruction receiving unit 26 displays an icon of a measurement candidate (display item) that is identified in Step S37A and is not excluded in Step S37B on the display device 193 through the display control unit 122A. Subsequently, the processing returns to Step S30. As a result, the user can be prevented from mistakenly selecting an icon of a measurement candidate that does not need to be selected by excluding a measurement candidate (display item) that does not need to be displayed from display targets in advance based on a measurement result of geometric shapes.

Figure 20D:
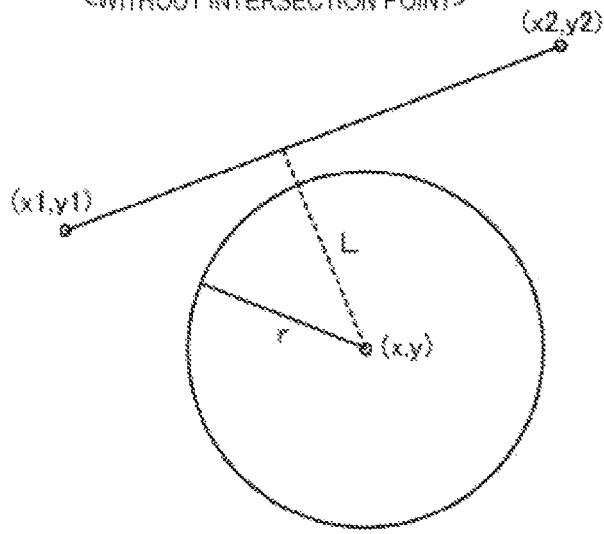

Herein, determination conditions except for "DETERMINATION CONDITION OF INTERSECTION OF CIRCLE AND CIRCLE" and "DETERMINATION CONDITION OF TANGENT TO CIRCLE AND CIRCLE" in the table in FIG. 19 will also be simply described. With regard to "DETERMINATION CONDITION OF INTERSECTION OF CIRCLE AND STRAIGHT LINE", "CHECK WHETHER THERE IS INTERSECTION POINT BASED ON DATA ABOUT CIRCLE AND STRAIGHT LINE" is defined as a calculation method, and "INAPPROPRIATE WITHOUT INTERSECTION POINT" is defined as a determination condition in the table in FIG. 19. FIG. 20D illustrates a case where a circle and a straight line are located away from each other. Under a condition that a distance L between the straight line and the circle calculated based on a measurement result of geometric shapes (straight line and circle) is greater than a radius r of the circle, the calculation instruction receiving unit 26 determines that there is no intersection point. With regard to "DETERMINATION CONDITION OF STRAIGHT LINE", as shown in the table in FIG. 19, "CALCULATE APPROXIMATE STRAIGHT LINE FROM DATA ABOUT PLURALITY OF DOTS BY LEAST SQUARE METHOD" is defined as a calculation method, and "EVALUATE VARIANCE OF DATA ABOUT EACH DOT FROM APPROXIMATE STRAIGHT LINE AND DETERMINE THAT IT IS INAPPROPRIATE UNDER A CONDITION THAT VARIANCE IS GREATER THAN OR EQUAL TO THRESHOLD VALUE" is defined as a determination condition. Therefore, under a condition that a variance of data about each dot from an expression of an approximate straight line calculated based on a measurement result of actual geometric shapes (dots) is greater than a threshold value, the calculation instruction receiving unit 26 determines that there is no straight line. With regard to "DETERMINATION CONDITION OF CIRCLE", as shown in the table in FIG. 19, "CALCULATE APPROXIMATE CIRCLE FROM DATA ABOUT PLURALITY OF DOTS BY LEAST SQUARE METHOD" is defined as a calculation method, and "EVALUATE VARIANCE OF DATA ABOUT EACH DOT FROM APPROXIMATE CIRCLE AND DETERMINE THAT IT IS INAPPROPRIATE UNDER A CONDITION THAT VARIANCE IS GREATER THAN OR EQUAL TO THRESHOLD VALUE" is defined as a determination condition. Therefore, under a condition that a variance of data about each dot from an expression of an approximate circle calculated based on a measurement result of actual geometric shapes (dots) is greater than a threshold value, the calculation instruction receiving unit 26 determines that there is no circle. Furthermore, with regard to "DETERMINATION CONDITION OF INTERSECTION OF STRAIGHT LINE AND STRAIGHT LINE", as shown in the table in FIG. 19, "OBTAIN COORDINATES OF INTERSECTION POINT FROM DATA ABOUT TWO STRAIGHT LINES" is defined as a calculation method, and "INAPPROPRIATE WITHOUT COORDINATES OF INTERSECTION POINT OR INAPPROPRIATE UNDER A CONDITION THAT COORDINATES OF INTERSECTION POINT HAVE INAPPROPRIATE VALUE" is defined as a determination condition. Therefore, under a condition that there are no coordinate of an intersection point calculated based on a measurement result of geometric shapes (two straight lines) (that is, under a condition that two straight lines are parallel to each other), or under a condition that coordinates of an intersection point have a value (for example, a value indicating a position at a distance of greater than or equal to 10000 mm from an origin of a device) deviated from a preset threshold value in a device, the calculation instruction receiving unit 26 determines that the two straight lines do not intersect.

As described above, according to the third embodiment, under a condition that an icon of a measurement candidate is displayed, a measurement candidate from which a value cannot be obtained or a measurement candidate having a value deviated from a predetermined range is excluded in advance, and the icon is then displayed. In this way, a user can be prevented from mistakenly selecting a measurement candidate that cannot be appropriately measured, and can efficiently select a measurement candidate. Therefore, operability for calculating a measurement candidate (measurement item) can be further improved.

In the third embodiment, the case where an icon of a measurement candidate excluded from display targets in Step S37B is not displayed is described (S37C), but this is not limited thereto. An excluded measurement candidate may be displayed in a state different from a measurement candidate that is not excluded. For example, the calculation instruction receiving unit 26 may display a masked icon of an excluded measurement candidate, or display an icon of an excluded measurement candidate in a color or a concentration different from that of an icon of a measurement candidate that is not excluded. The calculation instruction receiving unit 26 may also display an icon of an excluded measurement candidate provided with a mark, a character, a symbol, and the like (for example, a cross).

Note that, Step S38 in the processing in FIG. 14 described in the aforementioned second embodiment instead of Steps S37A to S37C described in the third embodiment may be performed.

Note that, the third embodiment may be appropriately combined with at least one of the above-described first and second embodiments, embodiments described hereinafter, and the variations.

Fourth Embodiment

Figure 23:
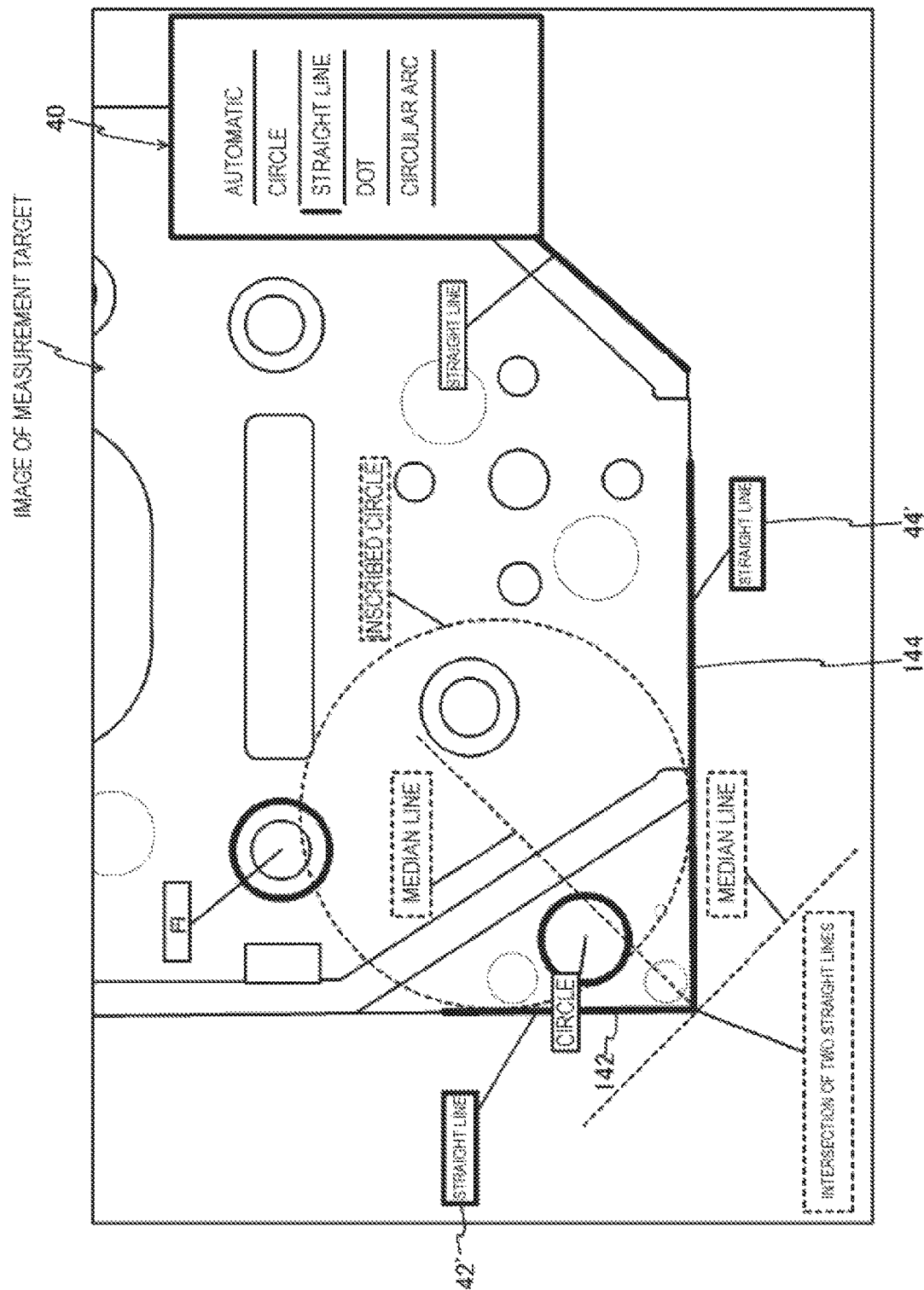
FIG. 23 is a diagram illustrating a display example of a display device in the fourth embodiment.

Next, a fourth embodiment will be described in detail based on FIGS. 21 to 23. Note that, an image measurement device in the fourth embodiment has the same configuration as that of the image measurement device 100 in the first embodiment as described above.

Figure 21:
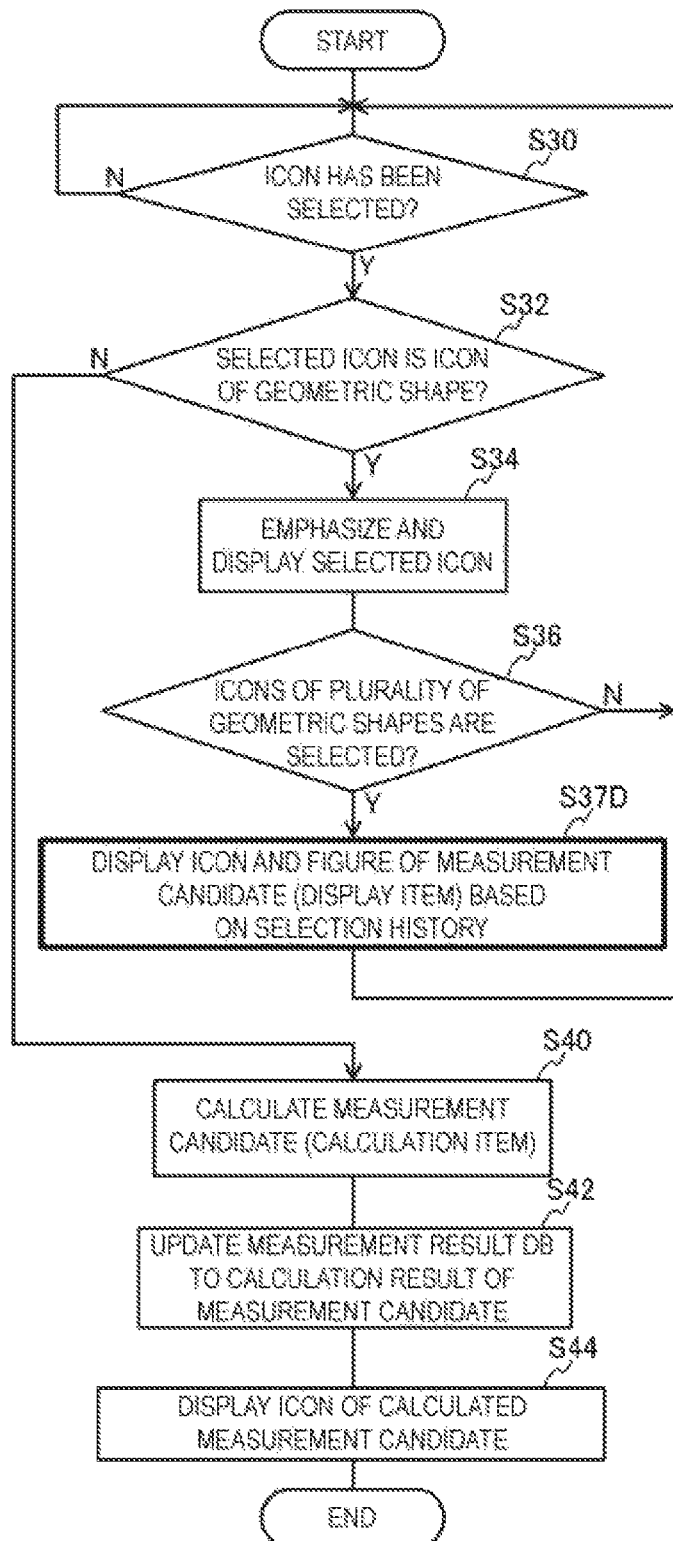
FIG. 21 is a flowchart showing processing of calculating a measurement candidate (measurement item) according to a fourth embodiment.

In the fourth embodiment, processing along a flowchart in FIG. 21 is performed instead of the processing in FIG. 8 described in the first embodiment. Note that, it is assumed in the fourth embodiment that the calculation instruction receiving unit 26 counts the number of selected times of a measurement candidate selected in the past for each user in a selection history DB as illustrated in FIG. 22 stored in the HDD 196.

Under a condition that the determination in Step S36 is confirmed in the processing in FIG. 21, that is, under a condition that a user has selected icons of a plurality of geometric shapes (geometric shape-related information), the processing proceeds to Step S37D. Then, under a condition that the processing proceeds to Step S37D, the calculation instruction receiving unit 26 displays, through the display control unit 122A, an icon of a measurement candidate (display item) corresponding to a combination of the selected geometric shapes. At the time of this display, the calculation instruction receiving unit 26 displays each icon in a different state based on a selection history of a user recorded in the selection history DB.

For example, it is assumed that the user has selected icons of two straight lines. In this case, the calculation instruction receiving unit 26 refers to the selection history DB in FIG. 22, and acquires information indicating that the number of selected times of a measurement candidate "INTERSECTION OF TWO STRAIGHT LINES" is 25 times, the number of selected times of "MEDIAN LINE" is three times, and the number of selected times of "INSCRIBED CIRCLE" is zero times. As illustrated in FIG. 23, the calculation instruction receiving unit 26 then displays an icon of each of the measurement candidates in the size according to the number of time it has been acquired. For example, the icon of "INTERSECTION OF TWO STRAIGHT LINES" having the greatest number of selected times is displayed to be the largest, and the icon of "INSCRIBED CIRCLE" having the smallest number of selected times is displayed to be the smallest. Further, the icon of "MEDIAN LINE" is displayed to be smaller than the icon of "INTERSECTION OF TWO STRAIGHT LINES" and larger than the icon of "INSCRIBED CIRCLE". In this way, the user can easily find and select an icon frequently selected by the user.

The processing returns to Step S30 after Step S37D. The processing other than Step S37D is the same as that in the first embodiment (FIG. 8).

As described above, according to the fourth embodiment, an icon of a measurement candidate is displayed in each different state based on a selection history of the measurement candidate. Thus, the user can easily find and select an icon of a measurement candidate frequently selected by the user. In this way, operability for calculating a measurement candidate (measurement item) can be improved.

In the fourth embodiment, the case where icons vary in size according to a selection history is described, but this is not limited thereto. For example, an icon of a measurement candidate having a great number of selected times may be displayed in a different color and concentration so as to stand out. Further, numbers or marks indicating decreasing order of the number of selected times or the number of selected times may be displayed on icons.

In the fourth embodiment, the case where the selection history DB is created for each user is described, but this is not limited thereto. For example, the selection history DB may be created by collecting a selection history for each kind or lot of a measurement target. In this way, display with consideration to a tendency for calculation of a measurement candidate of a measurement target can also be achieved. Thus, usability for a user can be improved. Further, the selection history DB may be created by collecting a selection history for each user and each kind or lot of a measurement target.

Note that, the selection history DB is created for a measurement candidate and an icon of the measurement candidate is displayed in each different state based on the selection history in the fourth embodiment, but the selection history DB may be created for, for example, a geometric shape other than a measurement candidate. In this case, the calculation instruction receiving unit 26 may display an icon of a geometric shape in each different state based on the selection history DB through the display control unit 122A. Specifically, icons of geometric shapes varying in size, color, and concentration according to the number of selected times in the past may be displayed, or numbers and marks indicating the number of selected times may be displayed on icons.

Note that, the fourth embodiment may be appropriately combined with at least one of the above-described first to third embodiments, embodiments described hereinafter, and the variations.

Fifth Embodiment

Figure 24A:
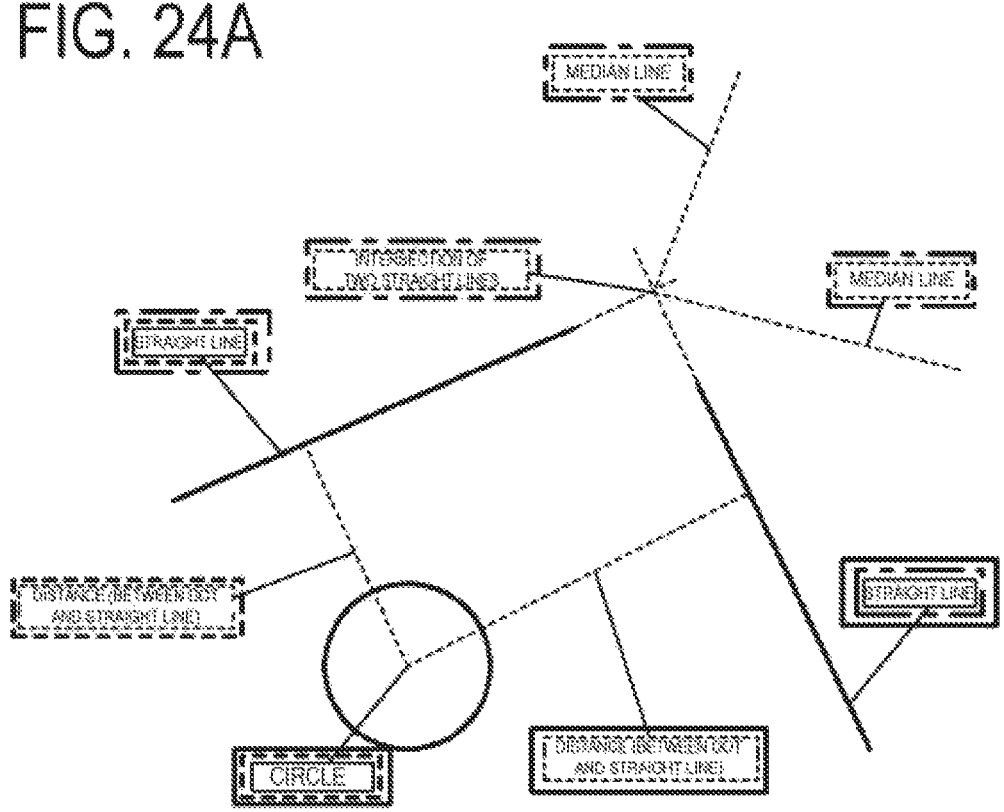
FIGS. 24A and 24B are diagrams for describing a fifth embodiment.

Next, a fifth embodiment will be described based on FIG. 24. FIG. 24A illustrates a display example of icons of geometric shapes and icons of measurement candidates according to the fifth embodiment. Note that, it is assumed in the fifth embodiment that the calculation instruction receiving unit 26 displays, through the display control unit 122A, measurement candidates corresponding to all combinations included in a plurality of geometric shapes selected by a user. That is, under a condition that the user selects an icon of one circle and icons of two straight lines, it is assumed that respective measurement candidates corresponding to a combination of the icon of the circle and the icon of one of the straight lines, a combination of the icon of the circle and the icon of the other straight line, and a combination of the icons of the two straight lines are displayed.

FIG. 24A illustrates a display example in which a user selects one circle and two straight lines. In this example, respective icons of "MEDIAN LINE", "MEDIAN LINE", and "INTERSECTION OF TWO STRAIGHT LINES" as measurement candidates (display items) corresponding to the two straight lines, "DISTANCE (BETWEEN DOT AND STRAIGHT LINE)" as a measurement candidate (display item) corresponding to the circle and one of the straight lines, and "DISTANCE (BETWEEN DOT AND STRAIGHT LINE)" as a measurement candidate (display item) corresponding to the circle and the other straight line are displayed. Note that, drawing of a measurement candidate "INSCRIBED CIRCLE" corresponding to the two straight lines is omitted to avoid complication of the diagram.

In the fifth embodiment, the display control unit 122A groups and displays icons to display the icons. Specifically, as illustrated in FIG. 24A, the calculation instruction receiving unit 26 displays frames indicated by dot-and-dash lines around the icons of the two straight lines and the respective icons of "MEDIAN LINE", "MEDIAN LINE", and "INTERSECTION OF TWO STRAIGHT LINES" corresponding to the two straight lines, displays frames indicated by thick solid lines around the icons of the circle and one of the straight lines and the icon of "DISTANCE (BETWEEN DOT AND STRAIGHT LINE)" as a measurement candidate (display item) corresponding to the circle and one of the straight lines, and displays frames indicated by thick broken lines around the icons of the circle and the other straight line and the icon of "DISTANCE (BETWEEN DOT AND STRAIGHT LINE)" as a measurement candidate (display item) corresponding to the circle and the other straight line, through the display control unit 122A.

In this way, the user can easily recognize which combination of geometric shapes a measurement candidate corresponds to. Therefore, operability for calculating a measurement candidate (measurement item) can be further improved.

In the example of FIG. 24A, the case where icons are expressed such that groups can be identified by types of frame lines is described, but this is not limited thereto. Icons may be expressed such that groups can be identified by color of frame lines, color in frames, and the like, or expressed such that groups can be identified by providing a specific number, character, mark, and the like to each of the icons.

Figure 24B:
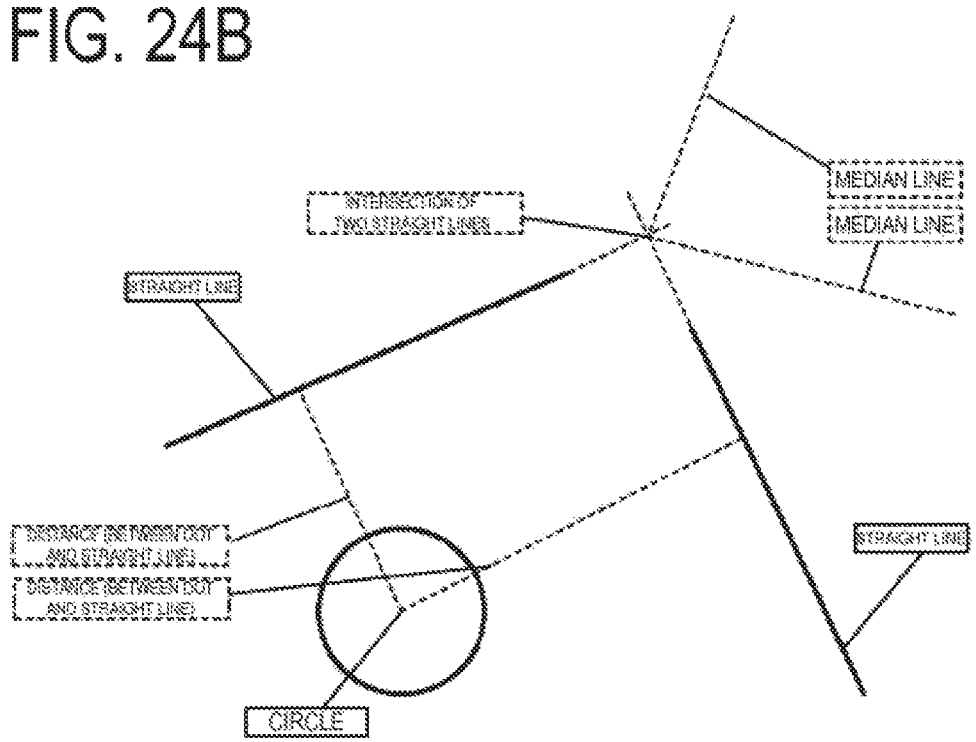

In the fifth embodiment, as illustrated in FIG. 24B, the display control unit 122A can group measurement candidates of the same kind and display the measurement candidates to be close to each other. In this way, the user can easily recognize a kind of a displayed measurement candidate and thus easily select a measurement candidate. As a result, operability for calculating a measurement candidate can be improved. Note that, measurement candidates of the same kind may not be grouped together and displayed to be close to each other. Icons may be expressed such that a group of measurement candidates of the same kind can be identified by color of frame lines, color in frames, and the like, or expressed such that a group of measurement candidates of the same kind can be identified by providing a specific number, character, mark, and the like to each of the icons. Note that, under a condition that measurement candidates of the same kind are grouped, the fifth embodiment is also applicable to a case where a plurality of measurement candidates corresponding to one combination of a plurality of geometric shapes selected by a user are displayed.

Note that, the fifth embodiment may be appropriately combined with at least one of the above-described first to fourth embodiments, embodiments described hereinafter, and the variations.

Sixth Embodiment

Next, a sixth embodiment will be described based on FIGS. 25 to 27.

Figure 25:
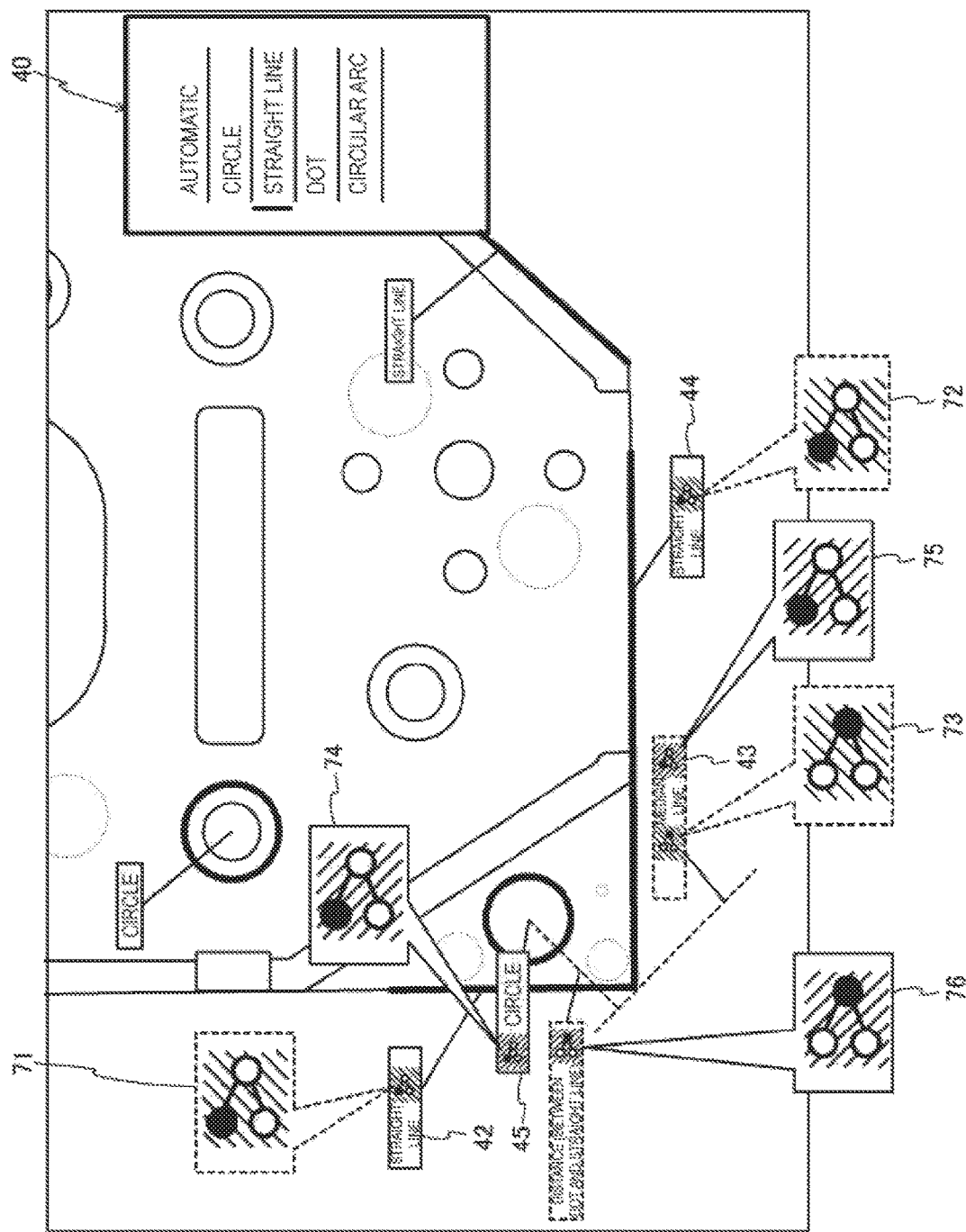
FIG. 25 is a diagram illustrating a display example of a display device in a sixth embodiment.

FIG. 25 illustrates a display example of icons according to the sixth embodiment. As a premise of the sixth embodiment, under a condition that a measurement candidate corresponding to a combination of geometric shapes (for example, two straight lines) is displayed and a user then selects one measurement candidate (for example, median line), the selected measurement candidate is calculated (similarly to the first to fifth embodiments). Then, under a condition that the user further selects the already calculated measurement candidate (for example, median line) and a geometric shape (for example, circle), a measurement candidate according to the selection is further displayed. Under a condition that the user selects one measurement candidate (for example, distance), the selected measurement candidate (measurement item) is calculated. Herein, under a condition that a measurement candidate is further calculated by using the already calculated measurement candidate, the calculation instruction receiving unit 26 refers to a combination table 334 as illustrated in FIG. 26. The combination table 334 in FIG. 26 further includes a field of a substitutable shape in addition to the fields of the combination table 34 in FIG. 6. Information indicating which geometric shape can substitute for an already calculated measurement candidate is stored in the field of the substitutable shape. For example, information indicating that measurement candidates "SPLIT DOT", and/or "AVERAGE DOT" can be substituted as a geometric shape "DOT" is stored in the combination table 334. Information indicating that measurement candidates "MEDIAN LINE" and/or "TANGENT TO CIRCLE AND CIRCLE" can be substituted as a geometric shape "STRAIGHT LINE" is stored in the combination table 334. FIG. 25 illustrates the display example in which the median line (sign 43) is calculated based on the two straight lines (signs 42 and 44) as mentioned above, and a distance between the calculated median line and the circle (sign 45) is then calculated.

In this case, the measurement item calculation unit 27 stores data as illustrated in FIG. 27 in the measurement result DB 32. Specifically, the measurement result DB 32 in FIG. 27 stores information indicating that information about the median line having ID=6 is calculated based on the straight lines having ID=1 and 2 and the distance (between dot and straight line) having ID=7 is measured based on the calculated median line having ID=6 and the circle having ID=4.

Therefore, it is assumed that the display control unit 122A performs display in FIG. 25 such that a relationship managed in the measurement result DB 32 is clear. For example, while performing display (display provided with hatching diagonal to lower left) representing a parent as indicated by signs 71 and 72 for the straight lines having ID=1 and 2, the display control unit 122A performs display (display provided with hatching diagonal to lower left) representing a child as indicated by a sign 73 for the median line having ID=6. Further, while performing display (display provided with hatching diagonal to lower right) representing a parent as indicated by signs 74 and 75 for the circle having ID=4 and the median line having ID=6, the display control unit 122A performs display (display provided with hatching diagonal to lower right) representing a child as indicated by a sign 76 for the distance (between dot and straight line) having ID=7.

In this way, display can be clearly performed such that a relationship between a parent and a child is visually recognizable, and thus operability for calculating a measurement candidate (measurement item) can be further improved. For example, the user can grasp a relationship between a parent and a child, and thus occurrence of a situation where a child is deleted by carelessly deleting a parent can be avoided.

Note that, the sixth embodiment may be appropriately combined with at least one of the above-described first to fifth embodiments, an embodiment described hereinafter, and the variations.

Seventh Embodiment

Figure 28A:
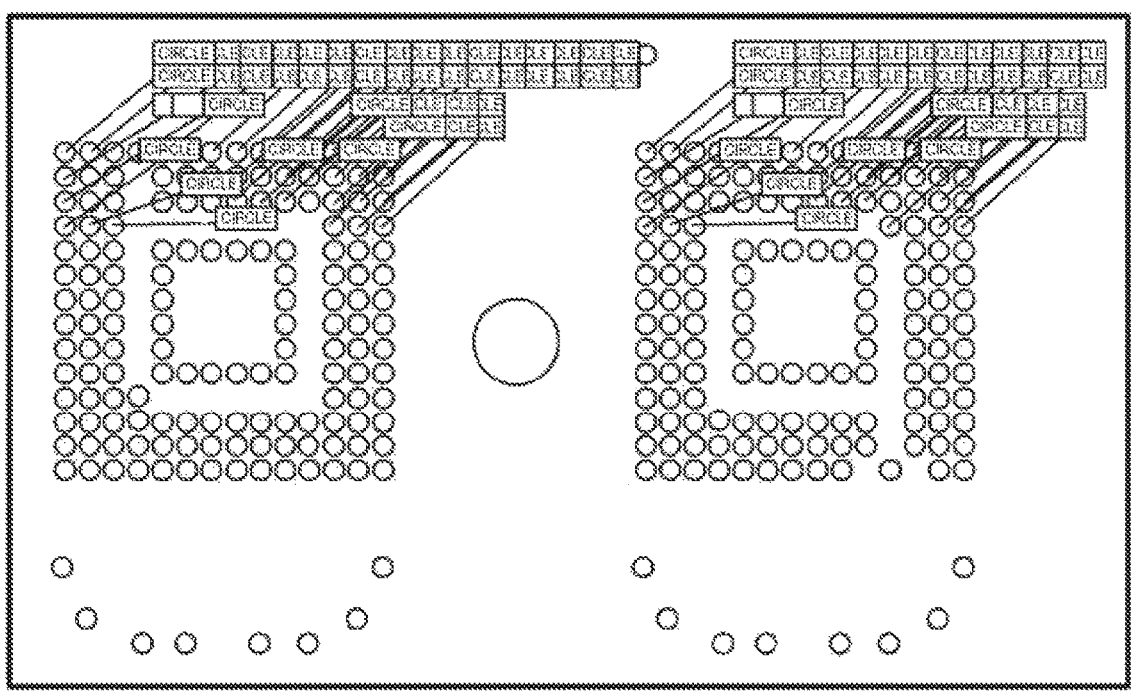
FIGS. 28A and 28B are diagrams (part one) for describing a seventh embodiment.

Next, a seventh embodiment will be described based on FIGS. 28 and 29.

It is assumed as a premise of the seventh embodiment that an image of a measurement target can be zoomed in or out, and a user selects and measures many geometric shapes (for example, circles) in the image with the image being zoomed in. Then, the image is zoomed out and displayed as illustrated in FIG. 28A to obtain a distance between two circles located away from each other. In this case, as illustrated in FIG. 28A, there are many icons of circles being measured geometric shapes, and thus it is difficult for the user to select an icon of a geometric shape used to calculate a measurement candidate.

Figure 28B:
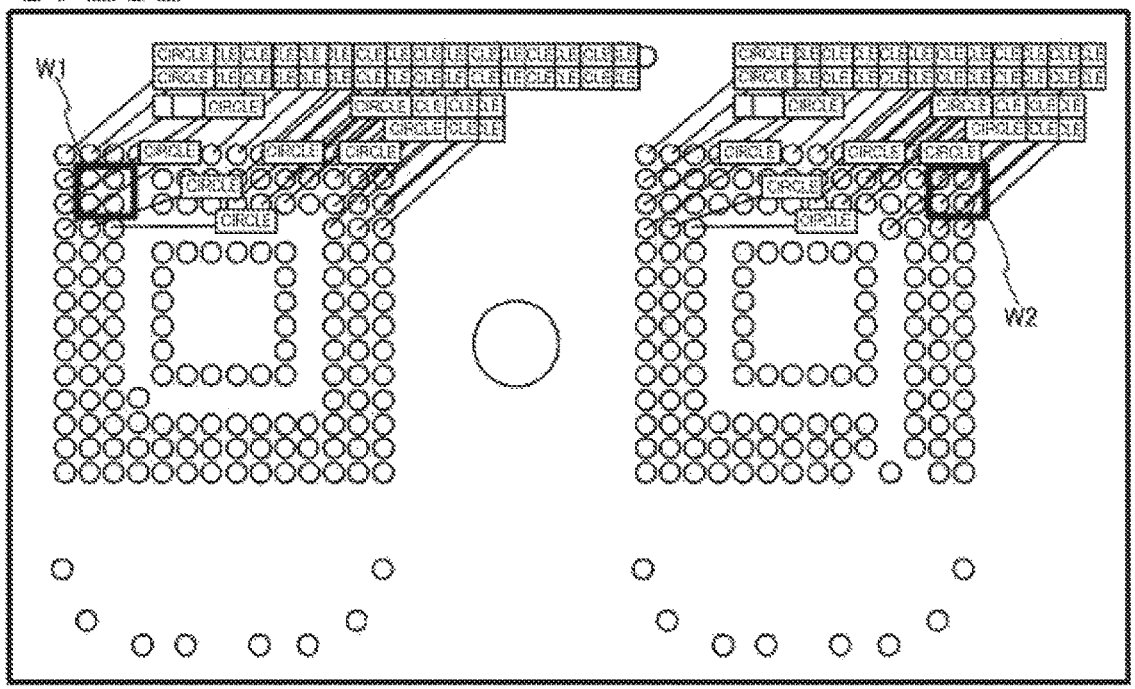
Figure 29:
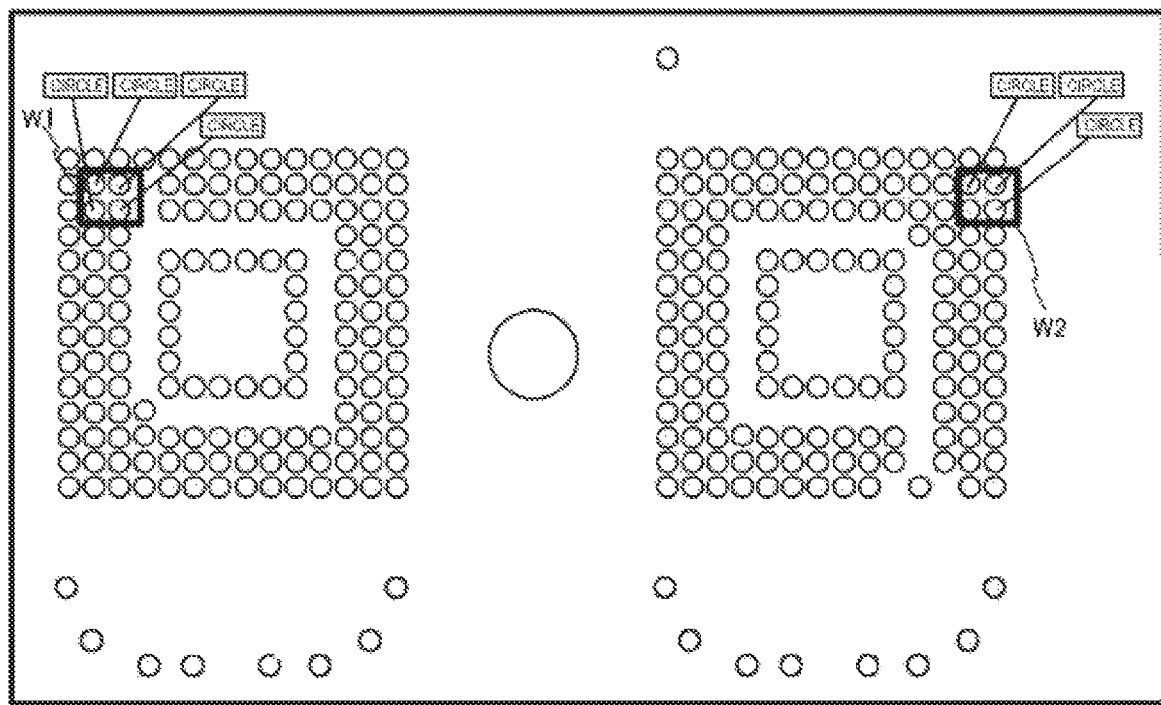
FIG. 29 is a diagram (part two) for describing the seventh embodiment.

Thus, in the seventh embodiment, under a condition that the user designates windows W1 and W2 as illustrated in FIG. 28B through the input device 195, the display control unit 122A identifies ranges (starting point coordinates, horizontal width of window, and vertical width of window) of the windows W1 and W2. Note that, it is assumed that starting point coordinates are, for example, coordinates of an upper left corner of the window. Herein, the user designates a position and a size of the window by identifying two points located diagonally of the window. Specifically, the user designates a position and a size of the window by a drag operation with the input device 195 being a mouse or a pinch-out operation with the input device 195 being a touch panel. Then, as illustrated in FIG. 29, the display control unit 122A identifies a geometric shape included in the range of each of the identified windows W1 and W2, and causes the display device 193 to display only an icon of the identified geometric shape.

In this way, according to the seventh embodiment, only an icon of a geometric shape included in a range desired to be selected by a user can be displayed, and thus the user can easily select the icon of the geometric shape under a condition that a measurement candidate is calculated. Therefore, operability for calculating a measurement candidate (measurement item) can be further improved.

In the present embodiment, the case where only an icon of a geometric shape included in a range of a window is displayed is described, but this is not limited thereto. For example, an icon of a geometric shape included in a window and an icon of a geometric shape that is not included in the window may be displayed in different states such that the icon of the geometric shape included in the range of the window is more easily selected than the other icon. For example, an icon of a geometric shape included in a window and an icon of a geometric shape that is not included in the window may vary in size, shape, color, concentration, and the like of the icons to be displayed.

Note that, in the seventh embodiment, under a condition that a list of measurement results stored in the measurement result DB 32 is displayed, only a measurement result of a geometric shape included in a range of a window designated by a user and only a calculation result of a measurement candidate may be displayed. In this way, a list of only measurement results in a range needed for the user can be displayed.

Note that, the seventh embodiment may be appropriately combined with at least one of the above-described first to sixth embodiments and the variations.

Note that, a product such as a component of an automobile and a mechanical component manufactured at a factory and the like is measured by using the image measurement device according to the aforementioned first to seventh embodiments, and quality of the product is determined based on a measurement result. Further, the product is selected as a non-defective product or a defective product based on a determination result, and only the product selected as a non-defective product proceeds to the next step.

Note that, the aforementioned processing functionality can be achieved by a computer. In this case, a program including a processing content of the functionality needed for the processing device is provided. The aforementioned processing functionality is achieved on the computer by the program executed by the computer. The program including the processing content may be recorded in a computer-readable recording medium (however, except for carrier wave).

For example, a portable recording medium such as a digital versatile disc (DVD) and a compact disk read only memory (CD-ROM) in which the program is recorded is sold to distribute the program. The program may be stored in a storage device of a server computer and transferred from the server computer to the other computer through a network.

The computer executing the program stores, for example, the program recorded in the portable recording medium or the program transferred from the server computer in the storage device of the computer. Then, the computer reads the program from the storage device, and executes processing following the program. Note that, the computer may read the program directly from the portable recording medium and execute the processing following the program.

The computer may also execute the processing following the received program successively every time the program is transferred from the server computer.

Note that, various modifications or improvements may be applied to each of the embodiments in the scope without departing from the purpose of the present disclosure. One or more of the requirements described in each of the embodiments may be omitted. A modified, improved, or omitted aspect in such a manner is also included in a technical scope of the present disclosure. The configurations of the embodiments may be appropriately combined and applied. Moreover, to the extent permissible by law, all publications and US patent documents related to the image measurement devices or the like used in each of the embodiments are incorporated herein by reference.

The invention claimed is:

1. An image measurement method for a measurement target comprising:
    selectably displaying geometric shape-related information that is information related to a geometric shape in an image of a measurement target;

selectably displaying related information of a measurement candidate based on a plurality of geometric shapes corresponding to at least a piece of geometric shape-related information, wherein the at least a piece of geometric shape-related information is selected from the geometric shape-related information displayed selectably; and outputting a calculation result of the measurement candidate corresponding to at least a piece of related information, wherein the at least a piece of related information is selected from the related information of the measurement candidate displayed selectably.

2. The image measurement method according to claim 1, wherein
the selectably displaying the related information of the measurement candidate includes referring information in which a plurality of geometric shapes is associated with a measurement candidate of the measurement target based on the geometric shape, and displaying related information of a measurement candidate of the measurement target based on a plurality of geometric shapes corresponding to the at least a piece of the geometric shape-related information.

3. The image measurement method according to claim 1, wherein
the selectably displaying the geometric shape-related information includes selectably displaying a plurality of pieces of geometric shape-related information in the measurement target, and
the selectably displaying the related information of the measurement candidate includes selectably displaying related information of a measurement candidate of the measurement target based on geometric shapes corresponding to a plurality of pieces of geometric shape-related information, wherein the plurality of pieces of geometric shape-related information is selected among the selectably displayed plurality of pieces of the geometric shape-related information.

4. The image measurement method according to claim 1, wherein
the selectably displaying the geometric shape-related information includes selectably displaying unselected geometric shape-related information corresponding to a geometric shape for which the measurement candidate is established in combination with a geometric shape corresponding to already selected geometric shape-related information in a state different from other geometric shape-related information corresponding to another geometric shape, or not displaying the other geometric shape-related information corresponding to the other geometric shape.

5. The image measurement method according to claim 1, wherein the selectably displaying the geometric shape-related information includes selectably displaying geometric shape-related information corresponding to a geometric shape included in a designated range and geometric shape-related information corresponding to a geometric shape that is not included in the designated range in different state, or not displaying geometric shape-related information corresponding to a geometric shape that is not included in the designated range.

6. The image measurement method according to claim 1, wherein
the selectably displaying the related information of the measurement candidate includes selectably displaying related information of a measurement candidate in which a value cannot be calculated or a calculated value deviates from a predetermined threshold value among the related information of the measurement candidates in a state different from other measurement candidate, or not displaying the measurement candidate in which the value cannot be calculated or the calculated value deviates from the predetermined threshold value among the related information of the measurement candidate.

7. The image measurement method according to claim 1, wherein
the selectably displaying the related information of the measurement candidate includes selectably displaying the related information of the measurement candidate in each different state based on a selection history of the related information of the measurement candidate.

8. The image measurement method according to claim 1, wherein
the selectably displaying the related information of the measurement candidate includes grouping and displaying a plurality of pieces of related information of related measurement candidates.

9. The image measurement method according to claim 1, wherein
the selectably displaying the related information of measurement candidate includes selectably displaying a correspondence between the geometric shape-related information and the related information of the measurement candidate based on the plurality of geometric shapes corresponding to the geometric shape-related information.

10. The image measurement method according to claim 1, further comprising:
identifying a geometric shape from an image of the measurement target;
receiving a selection of displayed geometric shape-related information; and
receiving a selection of a displayed related information of a measurement candidate.

11. A method for manufacturing an object comprising:
manufacturing an object;
calculating the measurement candidate of the object manufactured in the manufacturing step serving as a measurement target by using the image measurement method according to claim 1; and
determining quality of the object based on a calculation result in the calculating step.

12. A non-transitory computer readable recording medium storing an image measurement program for a measurement target, the program causing a computer to execute:
selectably displaying geometric shape-related information that is information related to a geometric shape in an image of a measurement target;
selectably displaying related information of a measurement candidate based on a plurality of geometric shapes corresponding to at least a piece of geometric shape-related information, wherein the at least a piece of geometric shape-related information is selected from the geometric shape-related information displayed selectably; and
outputting, in response to receiving a selection of the displayed related information of the measurement candidate, a calculation result of the measurement candidate corresponding at least a piece of related information, wherein the at least a piece of information is selected from the related information of the measurement candidate displayed selectably.

13. An image measurement device configured to measure an image of a measurement target comprising:
   a display controller configured to cause a display device to selectably display geometric shape-related information that is information related to a geometric shape in an image of a measurement target, the display control unit being configured to cause the display device to selectably display related information of a measurement candidate based on a plurality of geometric shapes corresponding to at least a piece of geometric shape-related information, wherein the at least a piece of geometric shape-related information is selected from the geometric shape-related information displayed selectably; and
   a calculator configured to calculate, in response to receiving a selection of the displayed related information of the measurement candidate, a calculation result of the measurement candidate corresponding to the at least a piece of related information, wherein the at least a piece of related information is selected from the related information of the measurement candidate displayed selectably.

14. The image measurement device according to claim 13, wherein
   the display control unit causes the display device to selectably display, in
   response to receiving selections of a plurality of pieces of geometric shape-related information in the measurement target, related information of a measurement candidate of the measurement target based on geometric shapes corresponding to the plurality of pieces of geometric shape-related information.

15. The non-transitory computer readable recording medium according to claim 12, wherein
   the selectably displaying the geometric shape-related information includes selectably displaying a plurality of pieces of geometric shape-related information in the measurement target, and
   the selectably displaying the related information of the measurement candidate includes selectably displaying related information of a measurement candidate of the measurement target based on geometric shapes corresponding to a plurality of pieces of geometric shape-related information, wherein the plurality of pieces of geometric shape-related information is selected among the displayed plurality of pieces of the geometric shape-related information.

16. The image measurement method according to claim 1, wherein the geometric shape-related information includes at least one of an icon indicating a geometric shape, a list indicating a geometric shape and an image indicating a geometric shape.

17. The image measurement method according to claim 1, wherein the related information of the measurement candidate includes at least one of an icon indicating a measurement candidate, a list indicating a measurement candidate and an image indicating a measurement candidate.

18. The non-transitory computer readable recording medium according to claim 12, wherein
   the selectably displaying the geometric shape-related information includes selectably displaying unselected geometric shape-related information corresponding to a geometric shape for which the measurement candidate is established based on a geometric shape corresponding to already selected geometric shape-related information in a state different from other geometric shape-related information corresponding to other geometric shape, or not displaying the other geometric shape-related information corresponding to the other geometric shape.

19. The non-transitory computer readable recording medium according to claim 12, wherein
   the selectably displaying the geometric shape-related information includes selectably displaying geometric shape-related information corresponding to a geometric shape included in a designated range and geometric shape-related information corresponding to a geometric shape that is not included in the designated range in different state, or not displaying geometric shape-related information corresponding to a geometric shape that is not included in the designated range.

20. The non-transitory computer readable recording medium according to claim 12, wherein
   the selectably displaying the related information of the measurement candidate includes selectably displaying related information of a measurement candidate in which a value cannot be calculated or a calculated value deviates from a predetermined threshold value among the related information of the measurement candidate in a state different from related information of other measurement candidate, or not displaying the measurement candidate in which the value cannot be calculated or the calculated value deviates from the predetermined threshold value among the related information of the measurement candidate.

21. The non-transitory computer readable recording medium according to claim 12, wherein
   the selectably displaying the related information of the measurement candidate includes selectably displaying the related information of the measurement candidate in each different state based on a selection history of the related information of the measurement candidate.

22. The non-transitory computer readable recording medium according to claim 12, wherein
   the selectably displaying the related information of the measurement candidate includes grouping and displaying plurality of pieces of related information of related measurement candidates.

23. The non-transitory computer readable recording medium according to claim 12, wherein
   the selectably displaying the related information of the measurement candidate includes selectably displaying a correspondence between the geometric shape-related information and the related information of the measurement candidate based on the plurality of geometric shapes corresponding to the geometric shape-related information.

24. The non-transitory computer readable recording medium according to claim 12, wherein the geometric shape-related information includes at least one of an icon indicating a geometric shape, a list indicating a geometric shape and an image indicating a geometric shape.

25. The non-transitory computer readable recording medium according to claim 12, wherein the related information of the measurement candidate includes at least one of an icon indicating a measurement candidate, a list indicating a measurement candidate and an image indicating a measurement candidate.

26. The image measurement device according to claim 13, wherein
   the display controller causes the display device to selectably display unselected geometric shape-related information corresponding to a geometric shape for which the measurement candidate is established in combination with a geometric shape corresponding to already selected geometric shape-related information in a state different from other geometric shape-related information corresponding to other geometric shape, or not to display the other geometric shape-related information corresponding to the other geometric shape.

27. The image measurement device according to claim 13, wherein
the display controller causes the display device to selectably display geometric shape-related information corresponding to a geometric shape included in a designated range and geometric shape-related information corresponding to a geometric shape that is not included in the designated range in different state, or not to display geometric shape-related information corresponding to a geometric shape that is not included in the designated range.

28. The image measurement device according to claim 13, wherein
the display controller causes the display device to selectably display related information of a measurement candidate in which a value cannot be calculated or a calculated value deviates from a predetermined threshold value among the related information of the measurement candidate in a state different from related information of other measurement candidate, or not to displaying the measurement candidate in which the value cannot be calculated or the calculated value deviates from the predetermined threshold value among the related information of the measurement candidate.

29. The image measurement device according to claim 13, wherein
the display controller causes the display device to selectably display the related information of the measurement candidate in each different state based on a selection history of the related information of the measurement candidate.

30. The image measurement device according to claim 13, wherein
the display controller causes the display device to group and display plurality of pieces of related information of related measurement candidates.

31. The image measurement device according to claim 21, wherein
the display controller causes the display device to display a correspondence between the geometric shape-related information and the related information of the measurement candidate based on the plurality of geometric shapes corresponding to the geometric shape-related information.

32. The image measurement device according to claim 13, wherein the geometric shape-related information includes at least one of an icon indicating a geometric shape, a list indicating a geometric shape and an image indicating a geometric shape.

33. The image measurement device according to claim 13, wherein the related information of the measurement candidate includes at least one of an icon indicating a measurement candidate, a list indicating a measurement candidate and an image indicating a measurement candidate.

* * * * *